(12) United States Patent
Jones

(10) Patent No.: US 8,163,352 B2
(45) Date of Patent: Apr. 24, 2012

(54) METHOD FOR SMOOTHING CEMENTITIOUS SLURRY IN THE PRODUCTION OF STRUCTURAL CEMENTITIOUS PANELS

(75) Inventor: John G. Jones, Beloit, WI (US)

(73) Assignee: United States Gypsum Company, Chicago, IL (US)

( * ) Notice: Subject to any disclaimer, the term of this patent is extended or adjusted under 35 U.S.C. 154(b) by 740 days.

(21) Appl. No.: 11/771,521

(22) Filed: Jun. 29, 2007

(65) Prior Publication Data

US 2009/0004378 A1    Jan. 1, 2009

(51) Int. Cl.
*B05D 7/00* (2006.01)
(52) U.S. Cl. ..................................... 427/403; 427/180
(58) Field of Classification Search .................. 427/180, 427/403; 264/165
See application file for complete search history.

(56) References Cited

U.S. PATENT DOCUMENTS

| | | |
|---|---|---|
| 4,379,729 A | 4/1983 | Cross |
| 4,420,295 A | 12/1983 | Clear et al. |
| 4,450,022 A | 5/1984 | Galer |
| 4,477,300 A | 10/1984 | Pilgrim |
| 4,490,070 A | 12/1984 | Upchurch et al. |
| 4,504,335 A | 3/1985 | Galer |
| 4,642,042 A | 2/1987 | Smith |
| 4,705,702 A | 11/1987 | Shimada et al. |
| 4,743,187 A | 5/1988 | Schermutzki |
| 4,767,491 A | 8/1988 | Vittone et al. |
| 4,778,718 A | 10/1988 | Nicholls |
| 5,209,968 A | 5/1993 | Sweeney |
| 5,462,642 A | 10/1995 | Kajander |
| 5,685,903 A | 11/1997 | Stav et al. |
| 5,858,083 A | 1/1999 | Stav et al. |
| 5,958,131 A | 9/1999 | Asbridge et al. |
| 6,054,022 A | 4/2000 | Helwig et al. |
| 6,054,205 A | 4/2000 | Newman et al. |
| 6,176,920 B1 | 1/2001 | Murphy et al. |

(Continued)

FOREIGN PATENT DOCUMENTS

JP     57203506 A     12/1982

(Continued)

OTHER PUBLICATIONS

Non-published U.S. Appl. No. 11/555,647 to Frank et al., filed Nov. 1, 2006.

(Continued)

*Primary Examiner* — Nathan Empie
(74) *Attorney, Agent, or Firm* — Novak Druce + Quigg, LLP; David F. Janci; Philip T. Petti

(57) ABSTRACT

A vibrating smoothing device or plate transverse to a direction of travel of deposited gypsum-cementitious slurry and embedded chopped fibers. The plate is used to smooth the top surface of the slurry panel as it exits a first fiber embedment station and a second slurry depositing station before passing through a second fiber embedment station of a structural cementitious panel production line to remove grooves and other non-uniform surface imperfections to have the slurry cover the embedded fibers. The plate is designed to float over the surface of the formed slurry without tearing or otherwise damaging the surface of the heavily fiber reinforced surface layers of the formed slurry before it sets. The vibrating plate is pivotally mounted on the web production line so it can float over the panel surface during use, but be raised off the line when not in use.

19 Claims, 7 Drawing Sheets

U.S. PATENT DOCUMENTS

| | | |
|---|---|---|
| 6,620,487 B1 | 9/2003 | Tonyan et al. |
| 6,638,393 B2 | 10/2003 | Lehan |
| 6,866,492 B2 | 3/2005 | Hauber et al. |
| 6,926,853 B2 | 8/2005 | Hinc et al. |
| 6,986,812 B2 | 1/2006 | Dubey et al. |
| 7,445,738 B2 * | 11/2008 | Dubey et al. ............ 264/128 |
| 2001/0000738 A1 | 5/2001 | Mathieu et al. |
| 2001/0017102 A1 | 8/2001 | Caldwell |
| 2002/0069950 A1 | 6/2002 | Lynn et al. |
| 2003/0211305 A1 | 11/2003 | Koval et al. |
| 2004/0084127 A1 * | 5/2004 | Porter ............... 156/42 |
| 2005/0064055 A1 | 3/2005 | Porter |
| 2005/0064164 A1 | 3/2005 | Dubey et al. |
| 2006/0018526 A1 | 1/2006 | Avinash |
| 2006/0119002 A1 | 6/2006 | Toncelli |
| 2006/0144005 A1 | 7/2006 | Tonyan et al. |
| 2006/0168905 A1 | 8/2006 | Blanc et al. |
| 2006/0168906 A1 | 8/2006 | Tonyan et al. |
| 2006/0174572 A1 * | 8/2006 | Tonyan et al. ............ 52/481.2 |
| 2006/0185267 A1 | 8/2006 | Tonyan et al. |
| 2006/0280932 A1 | 12/2006 | Kimura et al. |
| 2007/0045892 A1 | 3/2007 | Sucech et al. |
| 2007/0110838 A1 | 5/2007 | Porter |
| 2007/0110970 A1 * | 5/2007 | Dubey ............ 428/212 |
| 2008/0099133 A1 * | 5/2008 | Stivender ............ 156/245 |
| 2008/0099171 A1 * | 5/2008 | Frank et al. ............ 162/156 |
| 2008/0101150 A1 * | 5/2008 | George et al. ............ 366/8 |
| 2008/0101151 A1 * | 5/2008 | Frank et al. ............ 366/8 |
| 2008/0110276 A1 * | 5/2008 | Frank et al. ............ 73/803 |
| 2008/0241295 A1 * | 10/2008 | Dubey ............ 425/111 |

FOREIGN PATENT DOCUMENTS

| | | |
|---|---|---|
| JP | 2007505767 A | 3/2007 |
| KR | 1020060052946 A | 5/2006 |

OTHER PUBLICATIONS

Non-published U.S. Appl. No. 11/555,655 to George et al., filed Nov. 1, 2006.

Non-published U.S. Appl. No. 11/555,661 to Stivender, filed Nov. 1, 2006.

Non-published U.S. Appl. No. 11/555,665 to Frank et al., filed Nov. 1, 2006.

Non-published U.S. Appl. No. 11/555,658 to Frank et al., filed Nov. 1, 2006.

* cited by examiner

METHOD FOR SMOOTHING CEMENTITIOUS SLURRY IN THE PRODUCTION OF STRUCTURAL CEMENTITIOUS PANELS

CROSS REFERENCE TO RELATED APPLICATIONS

This application is related to co-pending patent applications:

U.S. Pat. No. 6,986,812 entitled SLURRY FEED APPARATUS FOR FIBER-REINFORCED STRUCTURAL CEMENTITIOUS PANEL PRODUCTION, issued on Jan. 17, 2006;

U.S. patent application Ser. No. 10/666,294 (issued as U.S. Pat. No. 7,445,738) entitled APPARATUS FOR PRODUCING HIGH STRENGTH FIBER-REINFORCED STRUCTURAL CEMENTITIOUS PANELS, filed Sep. 18, 2003;

U.S. patent application Ser. No. 11/555,647 (issued as U.S. Pat. No. 7,754,052), entitled PROCESS AND APPARATUS FOR FEEDING CEMENTITIOUS SLURRY FOR FIBER-REINFORCED STRUCTURAL CEMENT PANELS, filed Nov. 1, 2006;

U.S. patent application Ser. No. 11/555,655 (issued as U.S. Pat. No. 7,524,386), entitled METHOD FOR WET MIXING CEMENTITIOUS SLURRY FOR FIBER-REINFORCED STRUCTURAL CEMENT PANELS, filed Nov. 1, 2006;

U.S. patent application Ser. No. 11/555,661 (United States Patent Application Publication No. 2008/0099133), entitled PANEL SMOOTHING PROCESS AND APPARATUS FOR FORMING A SMOOTH CONTINUOUS SURFACE ON FIBER-REINFORCED STRUCTURAL CEMENT PANELS, filed Nov. 1, 2006;

U.S. patent application Ser. No. 11/555,665 (issued as U.S. Pat. No. 7,475,599) entitled WET SLURRY THICKNESS GAUGE AND METHOD FOR USE OF SAME, filed Nov. 1, 2006;

U.S. patent application Ser. No. 11/591,793 (issued as U.S. Pat. No. 7,670,520), entitled MULTI-LAYER PROCESS AND APPARATUS FOR PRODUCING HIGH STRENGTH FIBER-REINFORCED STRUCTURAL CEMENTITIOUS PANELS WITH ENHANCED FIBER CONTENT, filed Nov. 1, 2006; and U.S. patent application Ser. No. 11/591,957 (issued as U.S. Pat. No. 7,513,768), entitled EMBEDMENT ROLL DEVICE, filed Nov. 1, 2006, all herein incorporated by reference in their entirety.

FIELD OF THE INVENTION

This invention relates to a continuous process and related apparatus for producing structural panels using settable slurry, and more specifically, to a smoothing device used in the manufacture of reinforced cementitious panels, referred to herein as structural cement panels (SCP), in which fibers are combined with a settable gypsum cement slurry for providing a cement board or cementitious structural panel ("SCP").

BACKGROUND OF THE INVENTION

Cementitious panels have been used in the construction industry to form the interior and exterior walls of residential and/or commercial structures. The advantages of such panels include resistance to moisture compared to standard gypsum-based wallboard.

Typically, the cementitious panel includes at least one hardened cement or plaster composite layer between layers of a reinforcing or stabilizing material. In some instances, the reinforcing or stabilizing material is fiberglass mesh or the equivalent. The mesh is usually applied from a roll in sheet fashion upon or between layers of settable slurry. Examples of production techniques used in conventional cementitious panels are provided in U.S. Pat. Nos. 4,420,295; 4,504,335 and 6,176,920, the contents of which are incorporated by reference herein. Further, other gypsum-cement compositions are disclosed generally in U.S. Pat. Nos. 5,685,903; 5,858,083 and 5,958,131.

A goal when producing cementitious panels is to properly and uniformly distribute in the slurry the fibers, applied in a mat or web. Due to non-uniform distribution the reinforcing properties resulting due to the fiber-matrix interaction vary through the thickness of the board, depending on the thickness of each board layer. When insufficient penetration of the slurry through the fiber network occurs, poor bonding between the fibers and the matrix results, causing low panel strength. Also, in some cases when distinct layering of slurry and fibers occurs, improper bonding and inefficient distribution of fibers causes poor panel strength development.

Previous processes for forming a gypsum fiberglass board having fiberglass mats embedded in the gypsum slurry have used screed plates and optional edger bars to form the slurry into a panel and smooth the surface of the board, such as the forming device shown in U.S. Pat. No. 6,866,492 to Hauber et al. The forming and smoothing screed plate has been used as a final forming stage to distribute the slurry evenly over the embedded fiberglass mesh in the final formed panel and have used a blade inclined at a very acute angle of 30-60 degrees, which would disrupt the surface gypsum and fiber layer of our gypsum cement structural panel. Hauber et al is not using a multi-stage process for forming a structural panel from gypsum cement, aggregate and chopped fibers and is not concerned with eliminating defects in the core of these structural panels by eliminating air holes and voids in the intermediate slurry layers as multiple layers of gypsum aggregate slurry and chopped fibers are sequentially added over the earlier deposited layers of gypsum slurry and loose fiberglass fibers.

Other forming plates or bars, including plates equipped with vibrators, are disclosed in U.S. Pat. No. 4,642,042 to Smith, U.S. Pat. No. 4,767,491 to Vittome et al and US Published Patent Application No. 2001/0000738 to Mathieu. These references use a screed plate or blade to form a final cementitious fiberboard product. They are not used in the process of depositing gypsum and aggregate slurry over loose chopped fiber to overcome air holes and voids that lead to defects in the cores of structural cement panel made using a multi-stage slurry deposition and fiber embedment process.

Also, production line downtime, caused by premature setting of the slurry, especially in particles or clumps which impair the appearance of the resulting board, increases cementitious panel production costs, causes structural weaknesses and interferes with production equipment efficiency. Significant buildups of prematurely set slurry on production equipment require shutdowns of the production line, thus increasing the ultimate board cost.

Another design criteria of devices used to mix chopped reinforcing fibers into a slurry is that the fibers need to be mixed into the relatively thick slurry in a substantially uniform manner to provide the required strength.

Thus, there is a need for a device for more reliably thoroughly mixing fiberglass or other structural reinforcing fibers into settable slurry so that the device does not become clogged or impaired by chunks or setting slurry.

Moreover, U.S. Pat. No. 6,866,492 to Hauber et al, U.S. Pat. No. 4,642,042 to Smith, U.S. Pat. No. 4,767,491 to Vittome et al and US Published Patent Application No. 2001/0000738 to Mathieu do not operate on a slurry for which the present invention is particularly advantageous. Such a slurry is disclosed by commonly-assigned U.S. patent application Ser. No. 10/666,294 (issued as U.S. Pat. No. 7,445,738), entitled MULTI-LAYER PROCESS AND APPARATUS FOR PRODUCING HIGH STRENGTH FIBER-REINFORCED STRUCTURAL CEMENTITIOUS PANELS, filed Sep. 18, 2003, This discloses loose chopped fiberglass fibers mixed with the slurry to provide a cementitious structural panel (SCP) having structural reinforcement. It would be desirable to provide new devices to further ensure uniform mixing of the fibers and slurry. Such uniform mixing is important for achieving the desired structural strength of the resulting panel or board.

SUMMARY OF THE INVENTION

The present invention provides a method and a device for performing the method. The method comprises applying cementitious slurry comprising 35 to 70 wt. % reactive powder and sufficient water to form a slurry, typically 60-70% by of weight of the reactive powder, over a moving web, smoothing the slurry, applying a fiberglass layer over the smoothed slurry and embedding the fiberglass into the slurry to form a layer of cementitious material having fiberglass reinforcement.

The present invention achieves this with a flexible smoothing device or edger bar apparatus designed to apply a light uniform pressure to the entire top surface of the cementitious slurry after it is deposited on a continuous web carried from a head box forming station to smooth the top surface of the slurry and fill in any voids or pock mark in the slurry top surface and ensure that all of the fiber is covered by the gypsum-cement slurry before a layer of fiber is deposited on the top surface of the slurry. The smoothed slurry layer and fiber layer is then sent through a fiber embedment device.

The process may employ a multi-stage slurry deposition process having two or more deposition stages, typically 2 to 4 stages, for forming panels having multiple layers of cementitious material having fiberglass reinforcement. In the multi-stage process, each stage comprises a slurry deposition device, a glass fiber overlayer deposition station downstream of the respective slurry deposition device, optionally a glass fiber underlayer deposition station upstream of the respective slurry deposition device and an embedment device downstream of the respective glass fiber overlayer deposition station. In this multi-stage process a smoothing device is typically used at least in the second deposition stage between the slurry deposition device and the glass fiber overlayer deposition station. However, in this multi-stage process a smoothing device may be employed at any or all deposition stages between the respective slurry deposition device and the respective glass fiber overlayer deposition station. Preferably, the underlayer of chopped individual loose fibers and the overlayer of chopped individual loose fibers are deposited relative to each layer of deposited slurry.

Typically the smoothing device is employed in a multi-stage process for producing structural cementitious panels (SCP's or SCP panels) having a composition such as that described in U.S. patent application Ser. No. 11/555,661 (United States Patent Application Publication No. 2008/0099133), entitled PANEL SMOOTHING PROCESS AND APPARATUS FOR FORMING A SMOOTH CONTINUOUS SURFACE ON FIBER-REINFORCED STRUCTURAL CEMENT PANELS, filed Nov. 1, 2006. Each stage optionally applies a reinforcement fiber underlayer of loosely distributed, chopped fibers at a fiber underlayer deposition station upon a moving web, then applies a layer of slurry upon the moving web at a slurry deposition station (for example, a headbox), and then the smoothing device of the invention smoothes the slurry layer. Then a fiber overlayer deposition station deposits a reinforcement fiber overlayer of loosely distributed, chopped fibers over the smoothed slurry surface before entering an embedment device, such as sheep foot rollers or the embedment device of U.S. patent application Ser. No. 11/591,957 (issued as U.S. Pat. No. 7,513,768), entitled EMBEDMENT ROLL DEVICE, filed Nov. 1, 2006, to thoroughly mix the recently deposited fibers into the slurry so that the fibers are distributed throughout the slurry. Then additional layers of optional chopped reinforcement fiber underlayer, slurry and chopped reinforcement fiber overlayer are added, followed by more embedment. The process is repeated for each subsequent layer of the panel, as desired. Upon completion, the board has a more evenly distributed fiber component, which results in relatively strong panels without the need for thick mats of reinforcing fibers, as are taught in prior art production techniques for cementitious panels. Preferably, the underlayer of chopped individual loose fibers and the overlayer of chopped individual loose fibers are deposited relative to each layer of deposited slurry.

In the process depositing multiple layers of reinforcing fibers, the smoothing device uniformly spreads the slurry over earlier deposited reinforcing fiber layers before additional reinforcing fibers are deposited on the top surface of the slurry and then embedded into the slurry by the embedment device.

For example, the smoothing device may be installed in a four stage SCP production line after the second, third and fourth slurry depositing station before the next respective fiber overlayer is deposited and embedded. In this embodiment the settable slurry has formed a layer of fiber and cementitious slurry at least about 0.51 cm to 2.03 cm (0.2 to 0.8 in.), e.g., 1.27 cm (0.5 in) thick before the settable slurry is first smoothed to fill in any voids or openings in the slurry top surface over the loose fibers The smoothing device includes a smooth plate and a mounting stand for pivotally functionally mounting the smooth plate on the side dams of the traveling web between the respective slurry deposition device and the respective glass fiber overlayer deposition station. The smooth plate is made for example of lightweight metal which is relatively long and as wide as the formed cementitious slurry panel, i.e. about 102 to 152 cm (40 to 60 in) wide. The smooth plate is disposed generally transversely to the direction of travel of the panel on the web. A stiffening member across the width of the plate mounted on the top surface of the smooth plate.

Only the surface of a downstream end portion of the plate contacts the top surface of the formed panel and the plate of the smoothing device is curved so a small angle of entry is provided at the nip point. Typically the angle of entry is less than 30°, or in the range from 10° to 20°, preferably about 15°, at the nip point and preferably the angle tapers to zero where it makes initial contact with the unset gypsum-cement and fiber slurry. This allows for a very gradual, or zero, change in the height of the SCP slurry as it contacts the smoothing plate.

The device is a plate about 15.24 cm (6 inches) long and 127 cm. (50 inches) wide and 2.54 cm (1 inch) thick to make full contact over the panel's width. The stiffening end contacts 2.54 cm-10.2 cm (1-4 in.) of the panel's length at any time with a contact pressure of 0.0035 to 0.035 kg/cm$^2$ (0.05-0.5 psi). The pressure can be controlled by optional addition of weights on the opposite side of the stiffening end. The entire smoothing plate is supported by a bar at the proximal i.e. initial contact point allowing it to be pivoted at will for maintenance, etc.

Typically a pneumatic vibrator is mounted on the top surface of the smooth plate for imparting vibration to the stiffening member which will cause the smoothing surface of the plate to vibrate while in use, thereby aiding the smoothing of the panel surface to remove pock marks and grooves. For example, the vibrator may be mounted on the stiffening member to impart vibration to the entire surface in contact with the newly formed panel surface.

The smoothing device with its pivoting mounting is designed to have the downstream end portion of the plate "float" up and down over the surface of the freshly formed cementitious material and reinforcing fiber slurry. Thus, only a low pre-determined pressure is exerted on the top surface of the slurry to smooth the surface and fill in grooves or pock marks in the surface. Furthermore, the plate can be pivoted up and away from the panel production line when it is not in use. In addition to permitting it to be moved out of the way when not in use, the ability to pivot the plate up makes it easier to maintain and clean the device.

The present invention permits the incorporation and distribution of a relatively larger amount of slurry fibers throughout the slurry using fewer slurry layers and without the need for a final smoothing and forming screed plate after the slurry panel leaves the final embedment device station. Thus, panel production equipment and processing time can be reduced, while providing an SCP panel with enhanced strength characteristics.

DETAILED DESCRIPTION OF THE INVENTION

Figure 1:
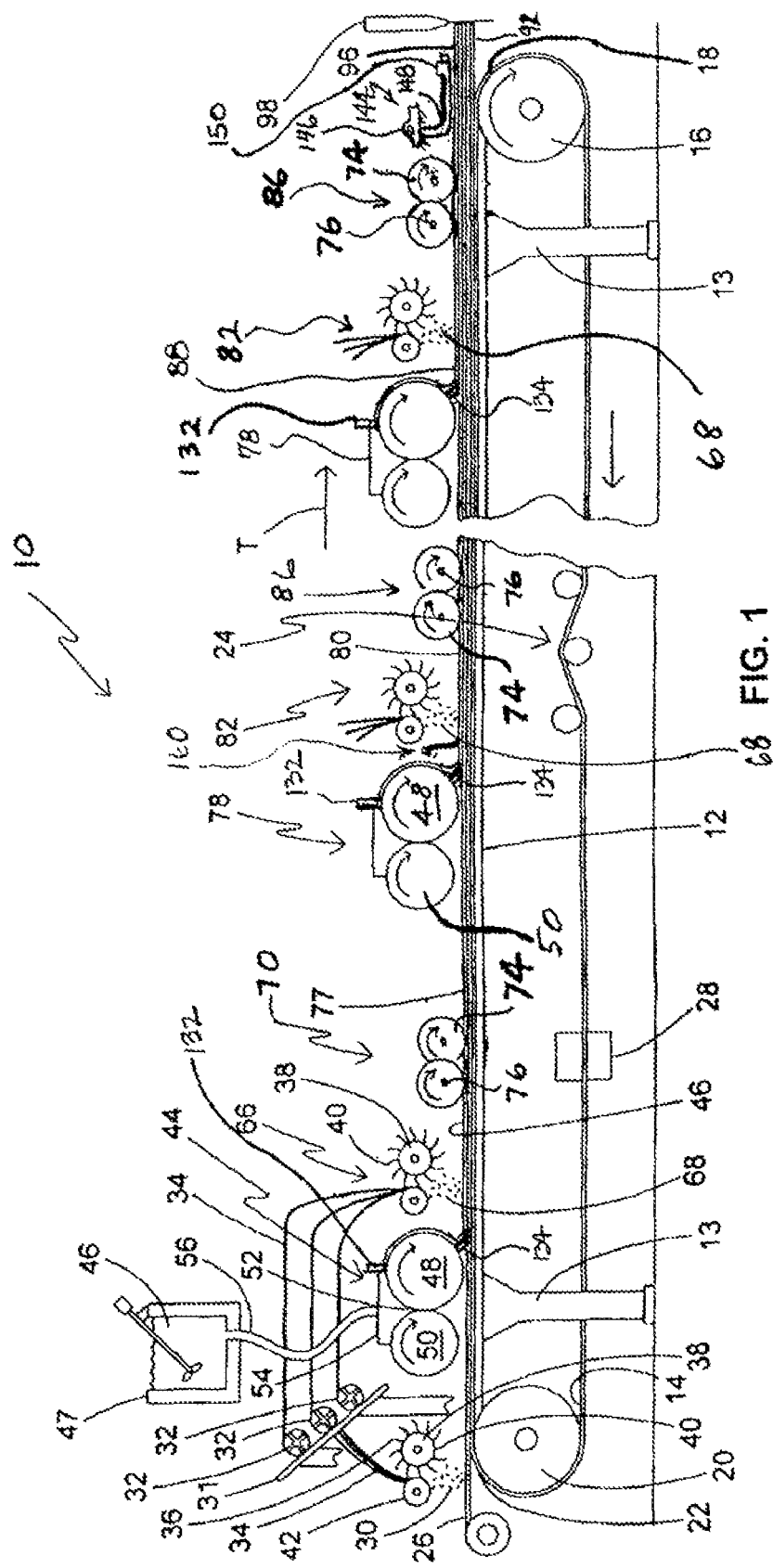
FIG. 1 is a perspective view of a cementitious panel (SCP) production line with an embodiment of a smoothing device of the invention.

Referring now to FIG. 1, a cementitious panel production line is diagrammatically shown and is generally designated 10.

While the present invention is intended for use in producing structural cement panels, it is contemplated that it may find application in any situation in which bulk fibers are to be mixed into a settable slurry for board or panel production.

Referring to FIG. 1, the operational components of the SCP panel production line will be described briefly, but they are described in more detail in the following documents:

U.S. Pat. No. 6,986,812 to Dubey et al., entitled SLURRY FEED APPARATUS FOR FIBER-REINFORCED STRUCTURAL CEMENTITIOUS PANEL PRODUCTION, herein incorporated by reference in its entirety; and the following co-pending, commonly assigned, United States patent applications all herein incorporated by reference in their entirety:

United States Patent Application Publication No. 2005/0064164 A1 to Dubey et al., application Ser. No. 10/666,294 (issued as U.S. Pat. No. 7,445,738), entitled, MULTI-LAYER PROCESS AND APPARATUS FOR PRODUCING HIGH STRENGTH FIBER-REINFORCED STRUCTURAL CEMENTITIOUS PANELS;

United States Patent Application Publication No. 2005/0064055 A1 to Porter, U.S. patent application Ser. No. 10/665,541 (issued as U.S. Pat. No. 7,182,589), entitled EMBEDMENT DEVICE FOR FIBER-ENHANCED SLURRY;

U.S. application Ser. No. 11/555,647 (issued as U.S. Pat. No. 7,754,052), filed Nov. 1, 2006 and entitled PROCESS AND APPARATUS FOR FEEDING CEMENTITIOUS SLURRY FOR FIBER-REINFORCED STRUCTURAL CEMENT PANELS;

U.S. patent application Ser. No. 11/555,655 (issued as U.S. Pat. No. 7,524,386), filed on Nov. 1, 2006, entitled METHOD FOR WET MIXING CEMENTITIOUS SLURRY FOR FIBER-REINFORCED STRUCTURAL CEMENT PANELS;

U.S. patent application Ser. No. 11/555,661 (United States Patent Application Publication No. 2008/0099133), entitled PANEL SMOOTHING PROCESS AND APPARATUS FOR FORMING A SMOOTH CONTINUOUS SURFACE ON FIBER-REINFORCED STRUCTURAL CEMENT PANELS, filed Nov. 1, 2006;

U.S. patent application Ser. No. 11/555,665 (issued as U.S. Pat. No. 7,475,599), filed Nov. 1, 2006, entitled WET SLURRY THICKNESS GAUGE AND METHOD FOR USE OF SAME;

U.S. patent application Ser. No. 11/591,793 (issued as U.S. Pat. No. 7,670,520), filed Nov. 1, 2006, and entitled MULTI-LAYER PROCESS AND APPARATUS FOR PRODUCING HIGH STRENGTH FIBER-REINFORCED STRUCTURAL CEMENTITIOUS PANELS WITH ENHANCED FIBER CONTENT; and U.S. patent application Ser. No. 11/591,957 (issued as U.S. Pat. No. 7,513,768), entitled EMBEDMENT ROLL DEVICE, filed Nov. 1, 2006;

all herein incorporated by reference in their entirety.

The production line 10 includes a support frame or forming table 12 having a plurality of legs 13 or other supports. Included on the support frame 12 is a moving carrier 14, such as an endless rubber-like conveyor belt with a smooth, water-impervious surface, however porous surfaces are contemplated. As is well known in the art, the support frame 12 may be made of at least one table-like segment, which may include designated legs 13 or other support structure. The support frame 12 also includes a main drive roll 16 at a distal end 18 of the frame, and an idler roll 20 at a proximal end 22 of the frame. Also, at least one belt tracking and/or tensioning device 24 is typically provided for maintaining a desired tension and positioning of the carrier 14 upon the rolls 16, 20. In this embodiment, the SCP panels are produced continuously as the moving carrier proceeds in a direction "T" from the proximal end 22 to the distal end 18.

In this embodiment, a web 26 of Kraft paper, release paper, or a plastic carrier, for supporting a slurry prior to setting, may be provided and laid upon the moving carrier 14 to protect it and/or keep it clean.

However, it is also contemplated that, rather than the continuous web 26, individual sheets (not shown) of a relatively rigid material, e.g., sheets of polymer plastic, may be placed on the carrier 14.

It is also contemplated that the SCP panels produced by the present line 10 are formed directly upon the moving carrier 14. In the latter situation, at least one belt washing unit 28 is provided. The moving carrier 14 is moved along the support frame 12 by a combination of motors, pulleys, belts or chains which drive the main drive roll 16 as is known in the art. It is contemplated that the speed of the moving carrier 14 may vary to suit the product being made.

Chopper for Depositing Underlayer

Structural cement panel (SCP panel), production is initiated by depositing a layer of loose, chopped fibers 30 of about one inch in size upon a plastic carrier on the web 26. A variety of fiber depositing and chopping devices are contemplated by the present line 10. For example, a typical system employs a rack 31 holding several spools 32 of fiberglass cord, from each of which a length or string 34 of fiber is fed to a chopping station or apparatus, also referred to as a chopper 36. Typically a number of strands of fiberglass are fed at each of the chopper stations.

The chopper 36 includes a rotating bladed roll 38 from which project radially extending blades 40 extending transversely across the width of the carrier 14, and which is disposed in close, contacting, rotating relationship with an anvil roll 42. In the preferred embodiment, the bladed roll 38 and the anvil roll 42 are disposed in relatively close relationship such that the rotation of the bladed roll 38 also rotates the anvil roll 42, however the reverse is also contemplated. Also, the anvil roll 42 is preferably covered with a resilient support material against which the blades 40 chop the cords 34 into segments. The spacing of the blades 40 on the roll 38 determines the length of the chopped fibers. As is seen in FIG. 1, the chopper 36 is disposed above the carrier 14 near the proximal end 22 to maximize the productive use of the length of the production line 10. As the fiber strands 34 are chopped, the fibers fall loosely upon the carrier web 26.

Slurry Mixer

To prepare and feed slurry the present production line 10 includes a feed station or slurry feeder or slurry headbox, generally designated 44 and a source of slurry, which in this embodiment is a wet mixer 47. The slurry feeder 44 receives a supply of slurry 46 from the wet mixer 47 for depositing the slurry 46 on chopped fibers on the carrier web 26. It is also contemplated that the process may begin with the initial deposition of slurry upon the carrier 14.

The cementitious slurry of the invention may be made from a core mix comprising water and a cementitious material i.e. a hydraulic cement that is able to set on hydration such as portland cement, magnesia cement, alumina cement, gypsum or blend thereof and an aggregate component selected from among mineral and non-mineral aggregates. The ratio of mineral aggregates to hydraulic cement may be in a ratio of 1:6 to 6:1. The ratio of non-mineral aggregate to hydraulic cement may be a ratio of 1:100 to 6:1.

The core mix may be composed of a lightweight mineral and/or organic aggregate such as sand, expanded clay, expanded shale, expanded perlite, expanded vermiculite, expanded closed cell glass beads, closed cell polystyrene beads.

While a variety of settable cementitious slurries are contemplated, the present process is particularly designed for producing structural cementitious panels (SCP panels). As such, the slurry 46 preferably comprises varying amounts of Portland cement, gypsum, aggregate, water, accelerators, plasticizers, foaming agents, fillers and/or other ingredients well known in the art, and described in the patents listed below which have been incorporated by reference. The relative amounts of these ingredients, including the elimination of some of the above or the addition of others, may vary to suit the intended use of the final product.

U.S. Pat. No. 6,620,487 to Tonyan et al., incorporated herein by reference in its entirety, discloses a reinforced, lightweight, dimensionally stable structural cement panel (SCP) which employs a core of a continuous phase resulting from the curing of an aqueous mixture of calcium sulfate alpha hemihydrate, hydraulic cement, an active pozzolan and lime. The continuous phase is reinforced with alkali-resistant glass fibers and containing ceramic microspheres, or a blend of ceramic and polymer microspheres, or being formed from an aqueous mixture having a weight ratio of water-to-reactive powder of 0.6/1 to 0.7/1 or a combination thereof. At least one outer surface of the SCP panels may include a cured continuous phase reinforced with glass fibers and containing sufficient polymer spheres to improve nailability or made with a water-to-reactive powders ratio to provide an effect similar to polymer spheres, or a combination thereof.

If desired the composition may have a weight ratio of water-to-reactive powder of 0.4/1 to 0.7/1.

Various formulations for the composite slurry used in the current process are also shown in published US applications US2006/185267, US2006/0174572; US2006/0168905 and US 2006/0144005, all of which are incorporated herein by reference in their entirety.

SCP compositions are described in more detail elsewhere in the present specification.

An embodiment of the wet powder mixer 47 is shown in FIG. 1, FIG. 2, FIG. 3 and FIG. 4 of U.S. application Ser. No. 11/555,655 (issued as U.S. Pat. No. 7,475,599), entitled METHOD FOR WET MIXING CEMENTITIOUS SLURRY FOR FIBER-REINFORCED STRUCTURAL CEMENT PANELS, filed Nov. 1, 2006, incorporated herein by reference.

A powder mixture of Portland cement, gypsum, aggregate, fillers, etc. is fed from an overhead hopper bin through a bellows to a horizontal chamber which has an auger screw driven by a side mounted auger motor. The solids may be fed from the hopper bin to the auger screw by a volumetric feeder or a gravimetric feeder (not shown).

Volumetric feeding systems would use an auger screw conveyor running at a constant speed to discharge powder from the storage hopper bin at a constant rate (volume per unit time, e.g., cubic feet per minute. Gravimetric feeding systems generally use a volumetric feeder associated with a weighing system to control the discharge of powder from the storage hopper bin at a constant weight per unit of time, e.g., pounds per minute. The weight signal is used via a feedback control system to constantly monitor the actual feed rate and compensate for variations in bulk density, porosity, etc. by adjusting the speed (RPM) of the auger screw.

The auger screw feeds the powder directly into the vertical mixing chamber through powder inlet located in an upper section of the vertical mixing chamber. Then the powder drops by gravity into the agitator equipped lower section of the vertical mixing chamber.

Liquid comprising water is simultaneously supplied to the vertical chamber by water inlets, e.g. nozzles, disposed around the perimeter of the upper portion of the chamber at a point below the inlet for the dry powder so that it also drops to the level of the agitator section of the vertical chamber. The direction of the individual water inlets can be manually adjusted to be directed on the paddle blades, etc. to maintain the surfaces free from powder build-up. The individual water inlets may be provided with valves. Dropping the powder and liquid separately into the vertical chamber advantageously avoids clogging at the inlet of the powder to the chamber, that might occur if the liquid and powder were mixed before entering the chamber, and permits feeding the powder directly into the vertical chamber using a smaller outlet for the auger than would be used if the liquid and powder were mixed before entering the chamber The water and powder are thoroughly mixed by a mixer paddle which has multiple paddle blades that are rotated on the paddle central shaft by a top mounted electric motor. The mixer is further illustrated in FIG. 5 of the above referenced U.S. patent application Ser. No. 11/555,655 (issued as U.S. Pat. No. 7,524,386). The number of paddle blades on the central shaft and the configuration of the paddle blades including the number of horizontal bars used in each paddle blade can be varied. For example, vertically mounted pins may be added to the horizontal bars of the blades to enhance agitation of the slurry. Typically the bars are flat horizontal members, rather than angled, to reduce the vortex in the lower portion of the mixing chamber. In one embodiment, it has been found that a dual bladed paddle, with a lower number of horizontal bars can be used in view of the higher mixing speeds obtained in a typical 12 inch diameter vertical chamber of the present invention. The paddles for embodiments of the production line of the present invention for mixing SCP slurry are designed to accommodate the slurry and the diameter of the lower portion of the mixing chamber. Increasing the diameter of the lower portion of the mixing chamber results in increasing the transverse width of the paddle. The increased transverse width of the paddle increases its tip speed at a given RPM. This causes a problem because the paddle is more likely to fling the slurry to the outer edges of the vertical mixing chamber and create an undesirable deep vortex in the middle of the lower portion of the mixing chamber. The paddle of the present invention for being employed with SCP slurry is preferably designed to minimize this problem by minimizing the number of horizontal mixing bars and flattening the horizontal mixing bars to minimize turbulence while still ensuring adequate mixing.

The level of the slurry in the vertical mixing chamber is controlled by electrical level control sensor disposed within the vertical mixing chamber. The control sensor controls the flow of water through electronically controlled valves and controls the powder feed into the vertical chamber by turning an auger motor on or off via a controller. The control of the volume of added water and slurry is thus used to control both the volume of the slurry in the vertical mixing chamber and the mixing residence time in the vertical mixing chamber. Once the slurry is adequately mixed, it is pumped from the bottom of the vertical mixing chamber by the slurry pump to the slurry feeding apparatus 44 by means of pump outlet. The pump can be run by the paddle central shaft that is driven by the top mounted electric motor, or a separate pump motor could be used to drive the pump.

The mixing residence time of the powder and water in the vertical mixing chamber is important to the design of the vertical chamber. The slurry mixture 46 must be thoroughly mixed and be of a consistency that can be easily pumped and deposited uniformly over the much thicker fiberglass layer on the web.

To result in adequately mixed slurry 46, the vertical chamber provides a suitable mixing volume for an average slurry residence time of typically about 10 to about 360 seconds while the spinning paddle applies shear force to the slurry in the mixing chamber. Typically, the vertical chamber provides an average slurry residence time of about 15 to about 240 seconds. The RPM range of the mixer paddle is typically 70 RPM to 270 RPM. Other typical ranges for average slurry residence time are from about 15 seconds to about 30 seconds or about 20 seconds to about 60 seconds.

A typical embodiment of a vertical chamber of the mixer 47 has a nominal inside diameter of about 8 to 14 inches (20.3 to 35.6 cm) or 10 to 14 inches (25.4 to 35.6 cm), e.g., 12 inches (30.5 cm.), a total vertical height of about 20 to 30 inches (50.8 to 76.2 cm), e.g., about 25 inches (63.5 cm) and a vertical height below the control sensor of about 6 to 10 inches (15.2 to 25.4 cm), e.g. about 8 inches (20.3 cm.). As the diameter increases, the paddles should be designed to accommodate these larger diameters to minimize the vortex effect caused by increases paddle tip speed at a given RPM as discussed above. The outer tips of the paddles are generally designed to be close, e.g., within about a quarter inch (0.64 cm) or about an eighth inch (0.32 cm), of the inner walls of the chamber. Too great a distance between the paddle tips and the inner walls of the chamber would result in slurry build-up.

Additional details of the wet slurry mixer used to mix the slurry that is provided to the production line in FIG. 1 are disclosed in U.S. patent application Ser. No. 11/555,655 (issued as U.S. Pat. No. 7,524,386) filed Nov. 1, 2006 and in U.S. patent application Ser. No. 11/555,658 (issued as U.S. Pat. No. 7,513,963), filed Nov. 1, 2006, both of which are incorporated herein by reference in there entirety.

Slurry Feed Apparatus

Referring now to FIG. 1, the present slurry feed apparatus, also referred to as a slurry feed station, a slurry feeder or slurry headbox, generally designated 44 receives a supply of slurry 46 from the wet mixer 47.

The preferred slurry feeder 44 includes a main metering roll 48 disposed transversely to the direction of travel "T" of the carrier 14. A companion or back up roll 50 is disposed in close, parallel, rotational relationship to the metering roll 48. Slurry 46 is deposited in a nip 52 between the two rolls 48, 50.

The slurry feeder 44 also has a gate 132 mounted to sidewalls of the slurry feed apparatus 44 to be mounted adjacent to the surface of the metering roll 48 to form a nip there between. The gate 132 is above the metering roll 48 so that the nip is between the gate 132 and an upper portion of the roll 48. The rolls 48, 50 and gate 132 are disposed in sufficiently close relationship that the nip between the gate 132 and an upper portion of the roll 48 retains a supply of the slurry 46, at the same time the rolls 48, 50 rotate relative to each other. Further description of the gate is provided by U.S. patent application Ser. No. 11/555,647 (issued as U.S. Pat. No. 7,754,052).

While other sizes are contemplated, typically the metering roll 48 has a larger diameter than the companion roll 50.

Also, typically one of the rolls 48, 50 has a smooth, stainless steel exterior, and the other, preferably the companion roll 50, has a resilient, non-stick material covering its exterior.

The gate 132 is provided with a vibrator (not shown). In particular, the gate 132 comprises a blade mounted to a vibrating gate support shaft/bar (not shown) and, optionally a stiffening member (not shown) mounted to the vibrating gate support shaft/bar. The gate blade is typically made of 16-12 gauge stainless sheet metal.

The stiffening member is attached to the backside of the vibrating gate support shaft and vibrating gate 132. The gate 132 is vibrated by means of a rotary vibrator mounted on a stiffening channel/member on the—backside—of the gate. A piece of flat stock that "clamps" the sheet metal gate to the gate support shaft (aluminum square stock).

If the stiffening member is not provided then the rotary vibrator may be attached to the gate support shaft or other suitable portion of the gate 132. The vibrating means is typically a pneumatic rotary ball vibrator. The level of vibration can be controlled with a conventional air regulator (not shown).

The stiffening member functions not only to stiffen the slurry gate, but, by mounting the vibratory unit on this stiffening member, this distributes the vibration across the length of the device more evenly. For example, if we mount the vibratory unit directly to the slurry gate, without the stiffening member, the vibration from the vibratory unit would be highly localized at the mounting point, with relatively little vibration out on the edges of the sheet. This is not to say that the vibratory unit cannot be mounted anywhere besides the stiffening member, but it is a preferred location since a stiffening member is typically employed and it does a good job of equally distributing the vibration.

The gate 132 may be mounted to the sidewalls 54 of the headbox 44 by a support system (not shown) to permit the position of the blade to be adjusted the horizontally, vertically as well. The support system includes a pivot pin attached, respectively, to each end of the gate support shaft and seated in an adjustable mount attached to a sidewall of the slurry feed apparatus. An embodiment of the adjustable mount has a pivot yoke seated in a U-shaped member. Screws pass through the upwardly extending legs of the U-shaped mount to permit forward and backwards adjustment of the position of the pivot yoke, and in turn the gate 132. Also, bolts are provided through holes of the U-shaped member for permitting up and down adjustment of the position of the pivot yoke, and in turn the gate 132.

Preferably, the vibrating gate 132 may be pivotally adjusted to vary the gap between the gate 132 and the metering roll 48 by means of an pivoting adjustment system (not shown).

The vibrating gate 132 helps to prevent significant build-up of slurry 46 on the gate 132 and controls the thickness of the slurry 46 deposited on the metering roll 48. The vibrating gate 132 can easily be removed from the wall mounts for cleaning and maintenance.

Additional details of the slurry feeder (headbox) 44 are disclosed in U.S. patent application Ser. No. 11/555,647 (issued as U.S. Pat. No. 7,754,052), filed Nov. 1, 2006 and incorporated herein by reference in its entirety.

Typically the slurry feeder 44 has a pair of relatively rigid sidewalls (not shown), preferably made of, or coated with non-stick material such as TEFLON® material or the like. The sidewalls prevent slurry 46 poured into the nip 52 from escaping out the sides of the slurry feeder 44. The sidewalls which are preferably secured to the support frame 12 (FIG. 1), are disposed in close relationship to ends of the rolls 48, 50 to retain the slurry 46. However, the sidewalls are not excessively close to ends of the rolls to interfere with roll rotation.

The slurry feeder 44 deposits an even layer of the slurry 46 of relatively controlled thickness upon the moving carrier web 26. Suitable layer thicknesses range from about 0.08 inch to 0.16 inch or 0.25 inch. However, with four layers preferred in the structural panel produced by the production line 10, and a suitable building panel being approximately 0.5 inch, an especially preferred slurry layer thickness is in the range of 0.125 inch. However, for a target panel forming thickness is about 0.84", the standard layer thickness is typically closer to about 0.21 inches at each of the 4 forming stations. A range of 0.1 inch to 0.3 inch per headbox may also be suitable.

Thus, the relative distance between the vibrating gate 132 and the main metering roll 48 may be adjusted to vary the thickness of the slurry 46 deposited. The nip distance between the gate 132 and the metering roll 48 is typically maintained at a distance of about ⅛ to about ⅜ inches (about 0.318 to about 0.953 cm). However, this can be adjusted based upon the viscosity and thickness of the slurry 46 and the desired thickness of the slurry to be deposited on the web 26.

To promote uniformly disposing the slurry 46 across the entire web 26, the slurry 46 is delivered to the slurry feeder 44 through a hose 56 or similar conduit having a first end in fluid communication with the outlet of the slurry mixer or reservoir 47. A second end of the hose 56 is connected to a laterally reciprocating, cable driven, fluid-powered dispenser of a type well known in the art. Slurry flowing from the hose 56 is thus poured into the feeder 44 in a laterally reciprocating motion to fill a reservoir defined by the rolls 48, 50 and the sidewalls of the slurry feeder 44. Rotation of the metering roll 48 draws a layer of slurry 46 from the reservoir.

The reciprocating dispensing mechanism is explained in greater detail in U.S. patent application Ser. No. 11/555,647 (issued as U.S. Pat. No. 7,754,052), entitled PROCESS AND APPARATUS FOR FEEDING CEMENTITIOUS SLURRY FOR FIBER-REINFORCED STRUCTURAL CEMENT PANELS, filed Nov. 1, 2006 and incorporated herein by reference in its entirety as well as U.S. Pat. No. 6,986,812 to Dubey et al. incorporated herein by reference in its entirety.

Another feature of the feeder apparatus 44 is that the main metering roll 48 and the companion roll 50 are both driven in the same direction which minimizes the opportunities for premature setting of slurry on the respective moving outer surfaces. A drive system (not shown), including a fluid-powered, electric or other suitable motor is connected to the main metering roll 48 or the companion roll 50 for driving the roll(s) in the same direction, which is clockwise when viewed in the production line in current FIG. 1. As is well known in the art, either one of the rolls 48, 50 may be driven, and the other roll may be connected via pulleys, belts, chain and sprockets, gears or other known power transmission technology to maintain a positive and common rotational relationship.

As the slurry 46 on the outer surface of the roll 48 moves toward the moving carrier web 26, it is important that all of the slurry be deposited on the web, and not travel back upward toward the nip 52. Such upward travel would facilitate premature setting of the slurry 46 on the rolls 48, 50 and would interfere with the smooth movement of slurry from the reservoir to the carrier web 26.

To assist in this, the slurry feeder 44 has a doctor blade 134. The doctor blade 134 is located between the main metering roll 48 and the carrier web 26 to completely deposit relatively thin slurry 46 as a continuous curtain or sheet of slurry uniformly directed down to within a distance of about 1.0 to about 1.5 inches (2.54 to 3.81 cm.) of the carrier web 26. The doctor blade 134 promotes the slurry 46 uniformly covering the fiberglass fiber layer upon the carrier web 26 and prevents the slurry 46 from proceeding back up toward the nip 52 and the feeder reservoir. The doctor blade 134 also helps keep the main metering roll 50 free of prematurely setting slurry 46. The doctor blade 134 is further described in U.S. patent application Ser. No. 11/555,647 (issued as U.S. Pat. No. 7,754,052) filed Nov. 1, 2006).

The doctor blade 134 removes the slurry from the surface of the metering roll 48 like the wire used in the process of U.S. Pat. No. 6,986,812 to Dubey et al. However, the doctor blade is an improvement over prior art stripping wires used in early slurry feeding systems and which allowed thinner slurries to deposit as drops of slurry on the web. This is particularly important where thinner slurries are used to cover the fiberglass layer, since thinner slurries have a tendency to drip over wires.

The doctor blade 134 is mounted on a doctor blade support shaft (not shown) mounted on a doctor blade tension arm pivotally mounted to adjustable pivot mount attached to the support frame or sidewall of the slurry feeder 44. A shaft or bar is attached to the sidewalls of the slurry feeder 44 above the metering roller 48. The doctor blade 134 is biased towards the roll 48 by a tensioning spring having a first end attached to the shaft or bar and a second end attached to the free end of the doctor blade tension arm. Thus, the doctor blade 134 is held in a position adjacent to the outer surface of the metering roll 48 by the tensioning arm and tensioning spring. The position of the doctor blade 134 can be adjusted by adjusting the adjustable pivot mount attached to the support frame or sidewall of the slurry feeder 44.

The doctor blade 134 is explained in greater detail in U.S. application Ser. No. 11/555,647 (issued as U.S. Pat. No. 7,754,052), entitled PROCESS AND APPARATUS FOR FEEDING CEMENTITIOUS SLURRY FOR FIBER-REINFORCED STRUCTURAL CEMENT PANELS, filed Nov. 1, 2006 and incorporated herein by reference in its entirety.

Chopper for Depositing Overlayer

After depositing the first layer of slurry, the moving carrier (conveyor belt) 14 carrying the web 26, chopped fiber underlayer and first layer of cementitious slurry then passes to an overlayer fiber deposition station 66 (chopper 66). Chopper 66 deposits a layer of loose, chopped fibers 68 of about one inch in size upon a plastic carrier 26 on the upper surface of the slurry. A variety of fiber depositing and chopping devices 66 are contemplated by the present line 10. For example, a typical system employs the rack 31 holding several spools 32 of fiberglass cord, from each of which a length or string 34 of fiber is fed to the chopping station or apparatus, also referred to as the chopper 66. Typically a number of strands of fiberglass are fed at each of the chopper stations.

As did chopper 36, the chopper 66 includes a rotating bladed roll 38 from which project radially extending blades 40 extending transversely across the width of the carrier 14, and which is disposed in close, contacting, rotating relationship with an anvil roll. In the preferred embodiment, the bladed roll 38 and the anvil roll are disposed in relatively close relationship such that the rotation of the bladed roll 38 also rotates the anvil roll; however the reverse is also contemplated. Also, the anvil roll is preferably covered with a resilient support material against which the blades 40 chop the cords 34 into segments. The spacing of the blades 40 on the roll 38 determines the length of the chopped fibers. As is seen in FIG. 1, the chopper 66 is disposed above the moving carrier 14. As the fiber strands 34 are chopped, the fibers fall loosely upon the slurry.

Embedment Device

After depositing the fiber overlayer, the moving carrier (conveyor belt) 14 carrying the web 26, chopped fiber underlayer, first layer of cementitious slurry, and chopped fiber overlayer then passes to a fiber embedment device 70.

While a variety of embedment devices are contemplated, including, but not limited to vibrators, sheep's foot rollers and the like, in the present embodiment of the embedment device 70 includes at least a pair of generally parallel shafts 76 mounted transversely to the direction of travel of the carrier web 14 on the frame 12. Each shaft 76 is provided with a plurality of relatively large diameter disks 76 which are axially separated from each other on the shaft by small diameter disks (not shown).

During SCP panel production, the shafts 76 and the disks 74 rotate together about the longitudinal axis of the shaft 76. As is well known in the art, either one or both of the shafts 76 may be powered, and if only one is powered, the other may be driven by belts, chains, gear drives or other known power transmission technologies to maintain a corresponding direction and speed to the driven shaft. The respective disks 74 of the adjacent, preferably parallel shafts 76 overlap and are intermeshed with each other for creating a "kneading" or "massaging" action in the slurry, which embeds the previously deposited fibers 68. In addition, the close, intermeshed and rotating relationship of the disks 74 prevents the buildup of slurry 46 on the disks, and in effect creates a "self-cleaning" action which significantly reduces production line downtime due to premature setting of clumps of slurry.

The intermeshed relationship of the disks 74 on the shafts 76 includes a closely adjacent disposition of opposing peripheries of the small diameter spacer disks (not shown) and the relatively large diameter main disks 74, which also facilitates the self-cleaning action. As the disks 74 rotate relative to each other in close proximity (but preferably in the same direction), it is difficult for particles of slurry to become caught in the apparatus and prematurely set. By providing two sets of disks 74 which are laterally offset relative to each other, the slurry 46 is subjected to multiple acts of disruption, creating a "kneading" action which further embeds the fibers 68 in the slurry 46.

An embodiment of embedment device 70 suitable for use in production line 10 is disclosed in greater detail in co-pending U.S. patent application Ser. No. 10/665,541 (issued as U.S. Pat. No. 7,182,589), filed Sep. 18, 2003, published as US 2005/0064055, and entitled EMBEDMENT DEVICE FOR FIBER-ENHANCED SLURRY, and incorporated herein by reference in its entirety.

Another embodiment of an embedment device suitable for use in production line 10 is disclosed by U.S. patent application Ser. No. 11/591,793, entitled MULTILAYER PROCESS AND APPARATUS FOR PRODUCING HIGH STRENGTH FIBER-REINFORCED STRUCTURAL CEMENTITIOUS PANELS WITH ENHANCED FIBER CONTENT (issued as U.S. Pat. No. 7,670,520) and U.S. patent application Ser. No. 11/591,957 (issued as U.S. Pat. No. 7,513,768), entitled EMBEDMENT ROLL DEVICE, filed Nov. 1, 2006. The embedment device 70 has rolls 76, 74 of interleaved rotating discs.

Applying Additional Layers

Once the fiber 68 has been embedded, a first layer 77 of the panel 92 is complete. In a preferred embodiment, the height or thickness of the first layer 77 is in the approximate range of 0.127 to 0.889 cm. (0.05 to 0.35 inches). This range has been found to provide the desired strength and rigidity when combined with like layers in a SCP panel. However other thicknesses are contemplated depending on the final intended use of the SCP panel.

To build a structural cementitious panel of desired thickness, additional layers are typically added. To that end, a second slurry feeder 78, which is substantially identical to the feeder 44, is provided in operational relationship to the moving carrier 14, and is disposed for deposition of an additional layer 80 of the slurry 46 upon the existing layer 77.

As discussed in detail below, the deposited slurry is then smoothed by a smoothing device 160.

After smoothing an additional fiber overlayer chopper 82, substantially identical to the choppers 36 and 66, is provided in operational relationship to the frame 12 to deposit a third layer of fibers 68 provided from a rack (not shown) constructed and disposed relative to the frame 12 in similar fashion to the rack 31. The fibers 68 are deposited upon the slurry layer 80 and are embedded using a second embedment device 86. Similar in construction and arrangement to the embedment device 70, the second embedment device 86 is mounted slightly higher relative to the moving carrier web 14 so that the first layer 77 is not disturbed. In this manner, the second layer 80 of slurry and embedded fibers is created.

Referring to FIG. 1, with each successive layer of settable slurry and fibers, an additional slurry feeder station 78 followed by a fiber chopper 82 and an embedment device 86 is provided on the production line 10. In a preferred embodiment, four total layers 77, 80, 88, 90 are provided to form the SCP panel 92 (see FIG. 2).

An important feature of the present invention is that the panel 92 has multiple layers 77, 80, 88, 90 which upon setting, form an integral, fiber-reinforced mass. Provided that the presence and placement of fibers in each layer are controlled by and maintained within certain desired parameters as is disclosed and described herein, it will be virtually impossible to delaminate the panel 92 produced by the present process.

Smoothing Device of the Present Invention

FIG. 1 shows the smoothing device 160 located after the second slurry layer deposition device (headbox 78) prior to depositing the next layer of fibers from additional fiber overlayer chopper 82 and embedding these fibers.

The smoothing device 160 may be provided after the second slurry deposition station and before the next fiber chopper and second fiber embedment station 86 as shown in FIG. 1. However, although not shown, good results are also obtained if the smoothing device 160 is provided between the second slurry deposition station 78 and the second overlayer fiber chopper 82 and provided between a third slurry deposition station 78 and third overlayer fiber chopper 82, of FIG. 1. If desired the smoothing device may be employed after any slurry deposition station.

Smoothing the slurry before applying the fiber overlayer is an improvement over a panel production process which delays smoothing until after the final embedment device station. In the panel production process, which delays smoothing until after the final embedment device station, a problem develops when bits of set gypsum-cement from the first slurry layer cause the "curtain" of slurry from the next slurry station headbox to "break" and not to deposit slurry onto the production line at that area. This leads to an uneven layer of slurry with areas of voids with uncovered fiber that would to go through the next fiber chopper. The absence of slurry in this area and the resulting deposit of fiber on this area of uncoated fibers can results in air voids and/or areas of delamination which produce a poor panel core.

It has also been found the slurry coming from the headbox is not always consistent in thickness. This can cause the layer of gypsum-cement to be distributed unevenly across the width of the panel which, if repeated over subsequent depositing stations, will result in rejection of the resulting panel. The use of the smoothing device 160 of this invention during the second slurry depositing step, and optionally after subsequent slurry depositing steps, significantly reduces or eliminates this problem.

Moreover, forming devices such as spring-loaded or vibrating plates or vibrating leveling screeds designed to conform the panel to suit desired dimensional characteristics are not used since they scrape away excess thickness of SCP panel material. Such devices would cause the fiberglass to begin to roll up and mar the surface of the panel instead of smoothing it.

Rather than spring-loaded devices and vibrating leveling screeds, the production line 10 includes a smoothing device 160, also termed a vibrating edger bar, to gently smooth an upper surface of the deposited slurry layer prior to depositing the next respective fiber overlayer. The smoothing device 160 typically comprises a longitudinally curved transversely flat plate 161 attached to a channel or stiffening member 162 that provides a point at which mounting elements 168, 169 may be attached as well as providing an area to attach a vibration unit 164.

The smoothing device 160 is transverse of the direction of travel "T" of the slurry 46 on the web 26 on the conveyor belt 14 to smooth the entire width of the upper surface 96 of the second layer of slurry being formed into a panel 92, and fill in any gaps or open areas of the slurry. This uniformly distributes the slurry over the embedded fibers before a second layer of fiber is deposited by the fiber chopper over the top surface of the second layer of settable slurry.

The plate or smoothing plate 161 has a width equal to the width of the forming area for the panel and an exemplary length "L" of about 15-24 cm (6-9.5 inches). The channel or stiffening member 162 is attached to the upstream leading edge of the plate to reinforce the plate. The smoothing plate 161 is typically made of metal or polymer, e.g., 10-12 gauge stainless steel and fairly rigid. Once the stiffening member is attached it is typically not flexible at least in the direction transverse to slurry movement.

In one embodiment, the smoothing plate is about 6 inches (15.24 cm) in length, about 50 inches (127 cm) in width and about 1 inch (2.54 cm) thick, corresponding to the width of the deposited settable slurry formed for the panel.

The plate 161 can be pivoted or rotated up and out for maintenance or cleaning by a lever. The plate 161 is pivotally mounted to a mounting bar (round bar) 163, that transverses the production line at a point immediately after the slurry headbox and before the next fiber chopper, which is in turn mounted to the frame 12 of the conveyor belt 14. The plate 161 is mounted onto the bar 163 to allow the plate 161 to pivot in the direction of the production line.

The trailing downstream end portion of the plate 161 contacts the topmost surface of the layer of the formed slurry 46 passing underneath it on the traveling web 26. The contact of the slurry layer 46 with the trailing downstream end of the plate 161 is typically limited to the final 6-8 inches (30.5 to 40.6 cm.) of the downstream end portion of the lower surface of the plate 161.

The stiffening member 162 stiffens the smoothing plate to reduce the chances for variation of the thickness of the formed panel by flexing or warping of the thin flexible smoothing plate. The stiffening member 162 is located on the top surface of the plate at a location about 4 to about 6 inches (10.2 to 15.2 cm.) upstream of the downstream end of the plate 161. Typically the stiffening member 162 is located at about the upper one-third of the plate and two-thirds from the trailing edge of the plate 161 in contact with the top surface 96 of the formed slurry 92.

Typically the edge of the flexible plate 161 is curved so a small angle "A" of entry, e.g., about 15° is provided at the nip point with the slurry 46 and preferably the angle tapers to zero. This allows for a very gradual, or zero, change in the height of the slurry layer as it contacts the smoothing plate 161. The smoothing device 160 reduces the need for costly finishing after the panels are cured and cut to size.

Figure 5B:
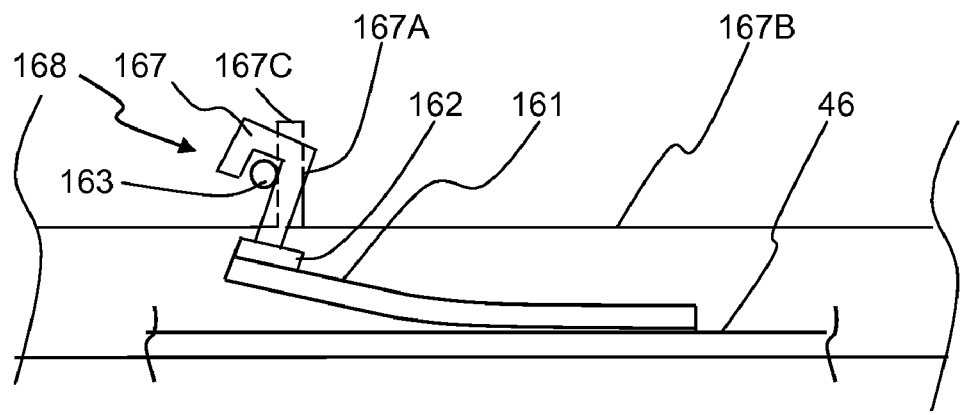
FIG. 5B is a side view of the smoothing device of FIG. 5 on the slurry on the conveyor belt.
Figure 3:
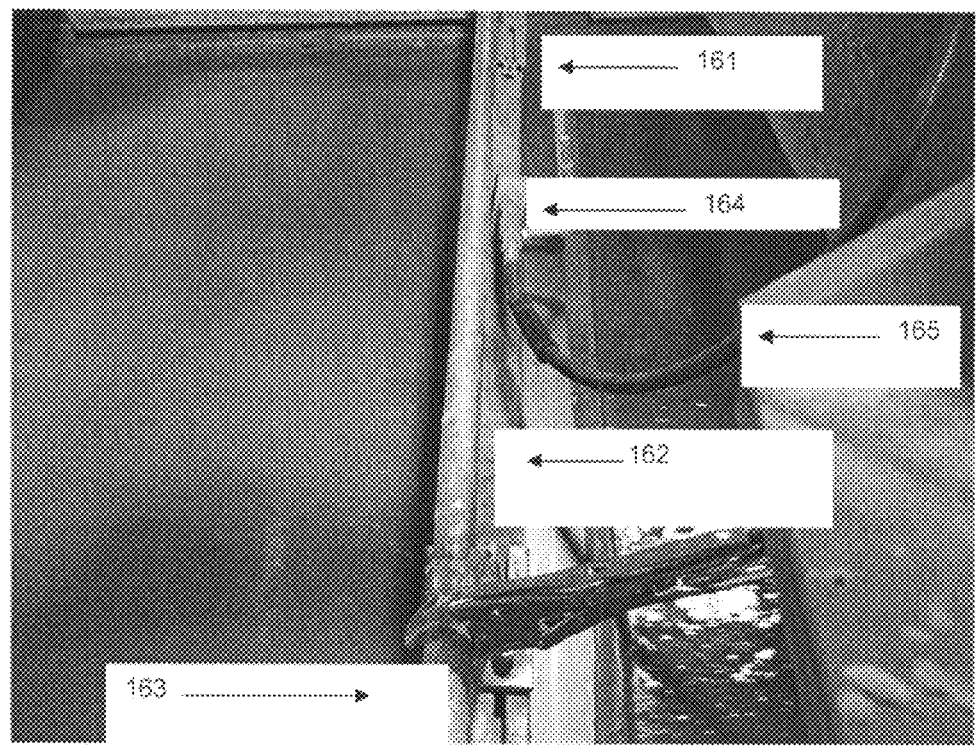
FIG. 3 is a photograph of the smoothing device of this invention pivotally mounted on the side dams of the board panel production line.
Figure 4:
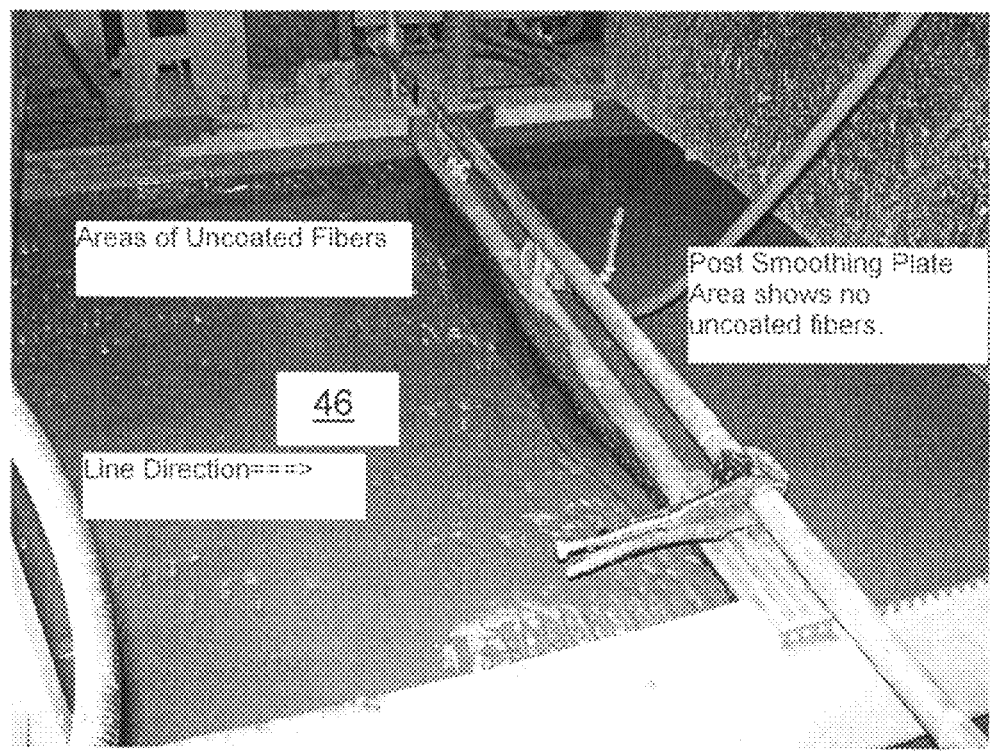
FIG. 4 is a photograph of the smoothing device of this invention with the slurry entering and leaving the smoothing device on the production line of FIG. 1.
Figure 5:
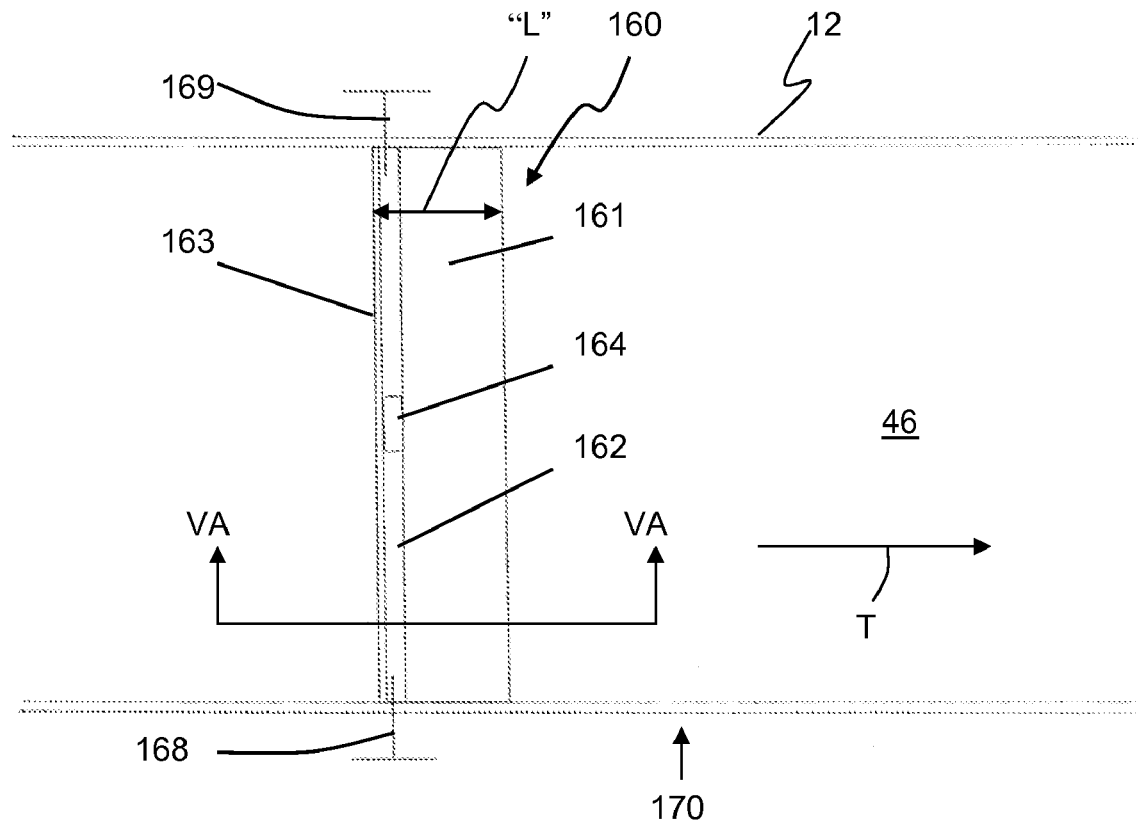
FIG. 5 is a top view of the smoothing device of the smoothing of the invention pivotally mounted transversely above the production line with the slurry moving under the smoothing plate as the slurry moves on the conveyor belt of the production line of FIG. 1.

The curved leading edge of the plate 161 has an upstream end pivotally attached to the support bar 163 by pivoting mounts 168 and 169. The mounts 168, 169 are in turn connected to the mounting channel or support bar (round bar) 163. As seen in FIGS. 3, 5 and 5B, the support bar 163 is mounted on the top of each of the web side dams of the conveyor line frame 12 immediately after the second slurry headbox 78 and before the second overlayer fiber chopper 82 (FIGS. 1 and 5). Typically, the pivoting mounts 168 and 169 are attached to the reinforcing channel or stiffening member 162. Each mount 168, 169 comprises a hinge 167 which in turn pivots on the support bar 163. The mounts 168 and 169 are designed to allow the plate 161 to pivot up away from the slurry 46 and suspend the plate 161 at the desired height above the formed settable slurry layer 46. The pivoting connection to the support bar 163 allows the plate 161 to ride ("float") up and down with the slurry layer 46 as it passes underneath the plate 161.

The plate 161 is in actual contact with the formed slurry layer for about 0.1 to 4.0 seconds, based upon the speed of the production line 10, with a preferred contact time of about 0.1 to 1.0 seconds.

The smoothing device 160 is designed to apply a pressure of about 0.05 to about 0.5 psi (0.036 to 0.36 Kg./sq. cm.) over the area of the panel, with a force of about 0.05 to 0.15 pounds per square inch, e.g. about 0.075 psi (0.054 Kg./sq. cm.), being preferred. This amount of force has been determined to provide the necessary pressure to smooth the surface of the formed panel and eliminate pock marks and grooves, without tearing or disrupting the surface of the fiber reinforced formed panel.

Advantageously, the smoothing plate performs this smoothing while allowing the glass fibers to retain their random distribution within the slurry. That is, the smoothing plate does not cause the fibers at the surface to exhibit directionality. Directionality of fibers on the top surface can cause the strength of the board to be significantly higher when tested in, for example, the cross machine direction as opposed to machine direction.

The smoothing device 160 advantageously avoids disrupting or tearing portions of the SCP panel from carrier web 26.

The vibration unit (vibrator) 164 on the reinforcing channel or stiffening member 162 vibrates and liquefies the slurry 46 to make it easier to spread the slurry 46 while it is in contact with the plate 161. Vibrating the slurry 46 as it ponds behind the smoothing plate 161 of the smoothing device 160, while traveling under the smoothing plate 161, facilitates the distribution of the fibers 30, 68 throughout the panel 92. It also provides a more uniform upper surface 96 in which all of the embedded fiber is uniformly covered with settable slurry, as shown in the photograph in FIG. 4. The vibrator 164 is typically powered by a pneumatic hose 165 (See FIG. 3). Mounting the vibrator 164 on the stiffening member 163 is preferred to distribute the vibration across the length of the device more evenly. For example, mounting the vibrator 164 directly to the smoothing plate (for example, in the center), without the stiffening member 162, would cause the vibration from the vibrator 164 to be highly localized at the mounting point, with relatively little vibration out on the edges of the plate. However, the vibrator 164 can be mounted somewhere besides the stiffening member 162 if desired.

Optionally the smoothing device 160 is provided with weights (not shown) to assist in smoothing the surface of the topmost layer of slurry. The optional weights are mounted on each side of the plate surface over a portion of the plate in contact with the slurry surface. The optional weights counter the tendency for the sides of the slurry 46 to "bow" upward as the center of the formed panel 92 is under pressure imparted by the center of the vibrating stiffening member 162.

Optional Final Forming, Smoothing and Cutting

Upon the disposition of the four layers of fiber-embedded settable slurry as described above, a forming/smoothing device may optionally be provided to the frame 12 to shape an upper surface 96 of the panel 92.

However, forming devices which scrape away excess thickness of SCP panel material are not desired. For example, forming devices such as spring-loaded or vibrating plates or vibrating leveling screeds designed to conform the panel to suit desired dimensional characteristics are not used with SCP material since they scrape away excess thickness of SCP panel material are not employed. Such devices would not effectively scrape away or flatten the panel surface. They would cause the fiberglass to begin to roll up and mar the surface of the panel instead of flattening and smoothing it.

Figure 6:
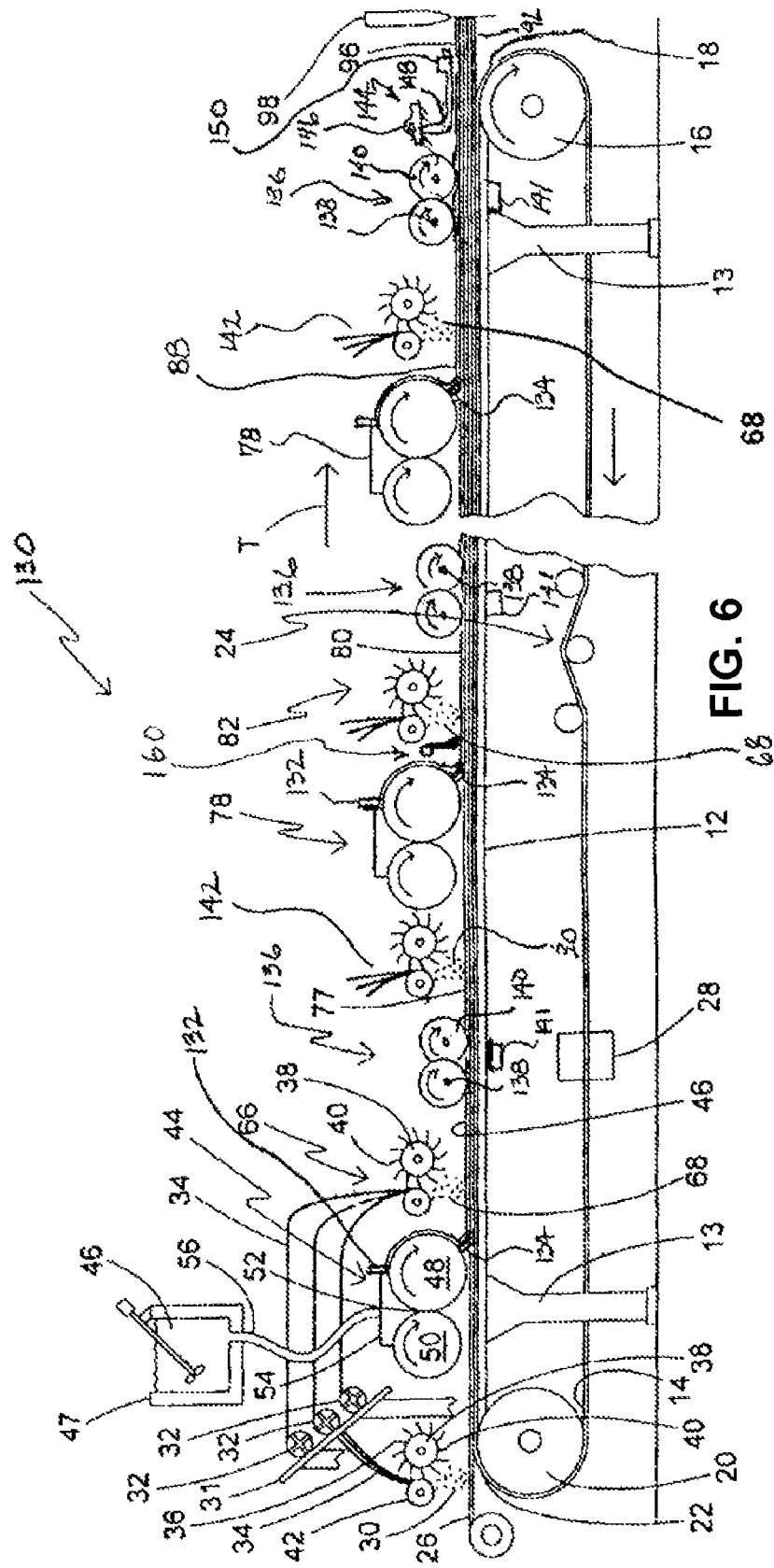
FIG. 6 is another embodiment of a structural cementitious panel production line.

In particular, rather than spring-loaded devices and vibrating leveling screeds, the production line 10 may include a forming/smoothing device, also termed a vibrating shroud, shown in FIG. 6 of U.S. patent application Ser. No. 11/555,661 (United States Patent Application Publication No. 2008/0099133) filed Nov. 1, 2006 as 144 provided to the frame 12 to gently smooth an upper surface 96 of the panel 92. U.S. patent application Ser. No. 11/555,661 is incorporated herein by reference in its entirety. The smoothing device 144 includes a mounting stand 146, a flexible sheet 148 secured to the mounting stand, a stiffening member extending the width of the sheet 148 and a vibration generator (vibrator) 150 preferably located on the stiffening member to cause the sheet 148 to vibrate. The sheet 148 has a first upstanding wall provided with a U-shaped upper portion, a curved wall and a second upstanding wall. The vibrator 150 is powered by a pneumatic hose The curved panel of the smoothing device 144 has an upstream end pivotally attached to a support bar which in turn is attached to mount 146 on the production line 10. The curved panel 148C has a trailing downstream end which contacts the topmost layer of the SCP material passing underneath it. If desired the smoothing device 144 is provided with weights to assist in leveling the topmost layer of slurry. In practice the smoothing device 144 is provided after the last embedment station 86 for forming of the panel.

The stiffening member functions not only to stiffen the smoothing sheet, but, by mounting the vibratory unit on this stiffening member, this distributes the vibration across the length of the device more evenly. For example, if we mount the vibratory unit directly to the smoothing sheet (say, in the center), without the stiffening member, the vibration from the vibratory unit would be highly localized at the mounting point, with relatively little vibration out on the edges of the sheet. This is not to say that the vibratory unit cannot be mounted anywhere besides the stiffening member 150B, but it is a preferred location since a stiffening member is typically anyway and it does a good job of equally distributing the vibration.

By applying vibration to the slurry 46, the smoothing device 144 facilitates the distribution of the fibers 30, 68 throughout the panel 92, and provides a more uniform upper surface 96.

Other forming devices are known in the art; however, the smoothing device 144 advantageously avoids disrupting or tearing portions of the SCP panel from carrier web 26. Forming devices that scrape away excess SCP material are not employed because they disrupt or tear the SCP material due to the fibrous nature of the panel product as it is being formed.

At this point, the layers of slurry have begun to set, and the respective panels 92 are separated from each other by a cutting device 98, which in a typical embodiment is a water jet cutter. Other cutting devices, including moving blades, are considered suitable for this operation, provided they can create suitably sharp edges in the present panel composition. The cutting device 98 is disposed relative to the line 10 and the frame 12 so that panels are produced having a desired length, which may be different from the representation shown in FIG. 1. Since the speed of the carrier web 14 is relatively slow, the cutting device 98 may be mounted to cut perpendicularly to the direction of travel of the web 14. With faster production speeds, such cutting devices are known to be mounted to the production line 10 on an angle to the direction of web travel. Upon cutting, the separated panels 92 are stacked for further handling, packaging, storage and/or shipment as is well known in the art.

Figure 2:
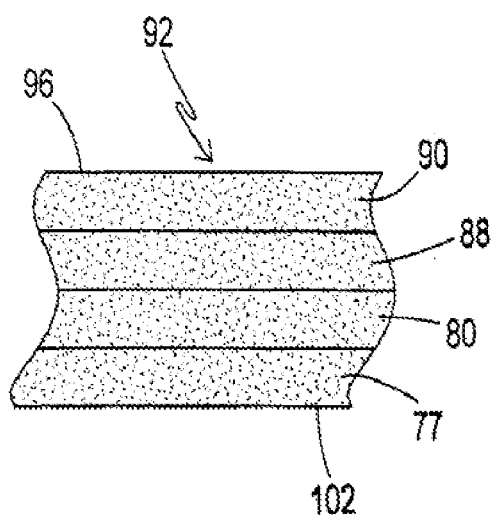
FIG. 2 is a side view of the slurry board panel produced in the production line of FIG. 1.

The production line 10 includes sufficient fiber chopping stations 36, 66, 82, slurry feeder stations 44, 78 and embedment devices 70, 86 to produce at least four layers 77, 80, 88 and 90 (FIG. 2). Additional layers may be created by repetition of stations as described above in relation to the production line 10.

Upon creation of the SCP panels 92, an underside 102 or bottom face of the panel may be smoother than the upper side or top face 96, even after being engaged by the forming device 94. In some cases, depending on the application of the panel 92, it may be preferable to have a smooth face and a relatively rough face. However, in other applications, it may be desirable to have a board in which both faces 96, 102 are smooth. The smooth texture is generated by the contact of the slurry with the smooth carrier 14 or the carrier web 26.

To obtain a SCP panel with both faces or sides smooth, both upper and lower faces 96, 102 may be formed against the carrier 14 or the release web 26 as disclosed by U.S. application Ser. No. 11/591,793 (issued as U.S. Pat. No. 7,670,520), entitled MULTI-LAYER PROCESS AND APPARATUS FOR PRODUCING HIGH STRENGTH FIBER-REINFORCED STRUCTURAL CEMENTITIOUS PANELS WITH ENHANCED FIBER CONTENT, filed Nov. 1, 2006.

Another alternative (not shown) is to sand one or both faces or sides 96, 102.

Another feature of the present invention is that the resulting SCP panel 92 is constructed so that the fibers 30, 68 are uniformly distributed throughout the panel. This has been found to enable the production of relatively stronger panels with relatively less, more efficient use of fibers. The volume fraction of fibers relative to the volume of slurry in each layer preferably constitutes approximately in the range of 1% to 5% by volume, preferably 1.5% to 3% by volume, of the slurry layers 77, 80, 88, 90. If desired, the outer layers 77, 90 may have a higher volume fraction that either or both of inner layers 80, 88.

Alternative Panel Production Line

The incorporation of a volume fraction of loose fibers distributed throughout the slurry 46 is an important factor in obtaining desired panel strength. Thus, improved efficiency in incorporating such fibers is desirable. It is believed the system depicted in FIG. 1 in some cases requires excessive numbers of slurry layers to obtain an SCP panel having sufficient fiber volume fraction.

Accordingly, an alternate SCP panel production line or system is illustrated in FIG. 6 and is generally designated 130 for producing high-performance, fiber reinforced SCP panels incorporating a relatively high volume of fibers per slurry layer. In many cases, increased levels of fibers per panel are obtained using this system. While the system of FIG. 1 discloses depositing a single discrete layer of fibers into each subsequent discrete layer of slurry deposited after the initial layer, the production line 130 includes a method of building up multiple discrete reinforcing fiber layers in each discrete slurry layer to obtain the desired panel thickness. Most preferably, the disclosed system embeds at least two discrete layers of reinforcing fibers, in a single operation, into an individual discrete layer of slurry. The discrete reinforcing fibers are embedded into the discrete layer of slurry using a suitable fiber embedment device.

More specifically, in FIG. 6 components used in the system 130 and shared with the system 10 of FIG. 1 are designated with identical reference numbers, and the above description of those components is considered applicable here. Furthermore, it is contemplated that the apparatus described in relation to FIG. 6 may be combined with that of FIG. 1 in a retrofit manner or be a new construction.

It is also contemplated that the system 130 of FIG. 6 may be provided with the upper deck 106 of U.S. patent application Ser. No. 11/591,793 (issued as U.S. Pat. No. 7,670,520), entitled MULTI-LAYER PROCESS AND APPARATUS FOR PRODUCING HIGH STRENGTH FIBER-REINFORCED STRUCTURAL CEMENTITIOUS PANELS WITH ENHANCED FIBER CONTENT, filed Nov. 1, 2006.

In the alternate system 130, SCP panel production is initiated by depositing a first layer of loose, chopped fibers 30 upon the web 26. Next, the slurry feed station, or the slurry feeder 44 receives a supply of slurry 46 from the remote mixer 47.

The mixer 47 and slurry 46 in this production line would be the same as that used in the production line 10 of FIG. 1.

Also, the slurry feeder 44 is basically the same, including the main metering roll, 48 and the back up roll 50 to form the nip 52 and having the sidewalls (not shown). Suitable layer thicknesses range from about 0.05 inch to 0.35 inch (0.13 to 0.9 cm). For instance, for manufacturing a nominal ¾ inch (1.9 cm) thick structural panel, four layers are preferred with an especially preferred slurry layer thickness less than approximately 0.25 inch (0.64 cm) in the preferred structural panel produced by the present process.

Referring to FIGS. 1 and 6, the slurry 46 is delivered to the feeder 44 through the hose 56 located in the laterally reciprocating, cable driven, fluid powered dispenser 58. Slurry flowing from the hose 56 is thus poured into the feeder 44 in a laterally reciprocating motion to fill a reservoir defined by the rolls 48, 50 and the sidewalls. Rotation of the metering roll 48 thus draws a layer of the slurry 46 from the reservoir.

The system 130 is preferably provided with the above-described vibrating gate 132 which meters slurry onto the deposition or metering roll 48. By vibrating, the gate 132 prevents significant buildup in the corners of the headbox 44 and provides a more uniform and thicker layer of slurry than was provided without vibration.

Even with the addition of the vibrating gate 132, the main metering roll 48 and the backup roll 50 are rotatably driven in the same direction of travel "T" as the direction of movement of the carrier 14 and the carrier web 26 which minimizes the opportunities for premature setting of slurry 46 on the respective moving outer surfaces.

As the slurry 46 on the outer surface 62 of the main metering roll 48 moves toward the carrier web 26, the above-described spring biased doctor blade 134 is provided which separates the slurry 46 from the main metering roll 48 and deposits the slurry 46 onto the moving web 26. The doctor blade 134 provides the slurry 46 with a direct path down to within about 1.5 inches of the carrier web 26, allowing an unbroken curtain of slurry to be continuously deposited onto the web or forming line, which is important to producing homogeneous panels.

Additional details of the gate 132 and the doctor blade 134 are provided in commonly assigned copending U.S. application Ser. No. 11/555,647 (issued as U.S. Pat. No. 7,754,052), filed Nov. 1, 2006, and entitled PROCESS AND APPARATUS FOR FEEDING CEMENTITIOUS SLURRY FOR FIBER-REINFORCED STRUCTURAL CEMENT PANELS, which is incorporated by reference.

A second chopper station or apparatus 66, preferably identical to the chopper 36, is disposed downstream of the feeder 44 to deposit a second layer of fibers 68 upon the slurry 46. The chopper apparatus 66 may be fed cords 34 from the same rack 31 that feeds the chopper 36. However, it is contemplated that separate racks 31 could be supplied to each individual chopper.

Referring again to FIG. 6, next, the embedment device generally designated 136, is disposed in operational relationship to the slurry 46 and the moving carrier 14 of the production line 130 to embed the first and second layers of fibers 30, 68 into the slurry 46.

As seen in FIG. 6, to implement the present system 130 of multiple layers of fibers 30, 68 for each layer of slurry 46, additional chopping stations 142 are provided to deposit an underlayer of fibers on the slurry between the embedment device 136 and subsequent slurry feeder boxes 78, so that for each layer of slurry 46, fibers 30, 68 are deposited before (underlayer of fibers) and after (overlayer of fibers) deposition of the slurry. This has been found to enable the introduction of significantly more fibers into the slurry and accordingly increase the strength of the resulting SCP panel. In the preferred production line four total layers of combined slurry and fiber are provided to form the SCP panel 92.

As seen in FIG. 6, the smoothing device 160 of the present invention is installed after the second slurry deposition station 78 and before the second overlayer fiber chopper 82 and second embedment device 136 so that the settable slurry can be uniformly spread over the fibers before another layer of fibers is added. The smoothing device 160 is particularly important in the process of FIG. 6 in view of the greater amount of fiber added to each of the multiple layers of settable slurry to avoid air voids and keep the slurry levels uniform for the final panel.

Although not shown, good results are also obtained if the smoothing device 160 is provided between the second slurry deposition station 78 and the second overlayer fiber chopper 82 and provided between a third slurry deposition station 78 and third overlayer fiber chopper 142, of FIG. 1. If desired the smoothing device 160 may be employed after any slurry deposition station.

Upon the disposition of the four layers of fiber-embedded settable slurry as described above, an optional forming device such as the smoothing device, or vibrating shroud, 144 is provided to the frame 12 to shape or smooth an upper surface 96 of the panel 92. By applying vibration to the slurry 46, the smoothing device 144 facilitates the distribution of the fibers 30, 68 throughout the panel 92, and provides a more uniform upper surface 96. The smoothing device 144 includes a mounting stand, a flexible sheet 148 secured to the mounting stand, a stiffening member extending the width of the sheet 148 and a vibration generator preferably located on the stiffening member (not shown) to cause the sheet to vibrate.

As mentioned above, an important feature of the present invention is that the panel 92 has multiple layers 77, 80, 88, 90 which upon setting, form an integral, fiber-reinforced mass. Provided that the presence and placement of fibers in each layer are controlled by and maintained within certain desired parameters as is disclosed and described below, it will be virtually impossible to delaminate the panel 92 produced by the present process.

Utilizing two discrete layers of reinforcing fibers with each individual discrete slurry layer provides the following benefits. First, splitting the total amount of fibers to be incorporated in the slurry layer into two or more discrete fiber layers reduces the respective amount of fibers in each discrete fiber layer. Reduction in the amount of fibers in the individual discrete fiber layer enhances efficiency of embedment of fibers into the slurry layer. Improved fiber embedment efficiency in turn results in superior interfacial bond and mechanical interaction between the fibers and the cementitious matrix.

Next, a greater amount of reinforcing fibers can be incorporated into each slurry layer by utilizing multiple discrete layers of reinforcing fibers. This is due to the finding that the ease of embedment of the fibers into the slurry layer has been found to depend upon the total surface area of the fibers in the discrete fiber layer. Embedment of the fibers in the slurry layer becomes increasingly difficult as the amount of fibers in the discrete fiber layer increases, causing an increase in the surface area of the fibers to be embedded in the slurry layer. It has been found that when the total surface area of the fibers in the discrete fiber layer reaches a critical value, embedment of the fibers into the slurry layers becomes almost impossible. This imposes an upper limit on the amount of fibers that can successfully be incorporated in the discrete layer of slurry. For a given total amount of fibers to be incorporated in the discrete slurry layer, use of multiple discrete fiber layers reduces the total surface area of the fibers in each discrete fiber layer. This reduction in the fiber surface area (brought about by the use of multiple discrete fiber layers) in turn provides an opportunity to increase the total amount of fibers that can successfully be embedded into the discrete layer of slurry.

In addition, the use of multiple discrete fiber layers allows tremendous flexibility with respect to the distribution of fibers through the panel thickness. The amount of fibers in the individual discrete fiber layers may be varied to achieve desired objectives. The resulting creation of a "sandwich" construction is greatly facilitated with the presence of a larger number of discrete fiber layers. Panel configurations with fiber layers having higher amount of fibers near the panel skins and lower amount of fibers in the fiber layers near the panel core are particularly preferred from both product strength and cost optimization perspectives.

In quantitative terms, the influence of the number of fiber and slurry layers, the volume fraction of fibers in the panel, and the thickness of each slurry layer, and fiber strand diameter on fiber embedment efficiency has been investigated and established as part of the present system 130. A mathematical treatment for the concept of projected fiber surface area fraction for the case involving two discrete fiber layers and one discrete slurry layer is introduced and derived below. It has been found that it is virtually impossible to embed fibers in the slurry layer if the projected fiber surface area fraction of the discrete fiber layer exceeds a value of 1.0. Although the fibers may be embedded when the projected fiber surface area fraction falls below 1.0, the best results are obtained when the projected fiber surface area fraction is less than 0.65. When the projected fiber surface area fraction ranges between 0.65 and 1.00, the efficiency and ease of fiber embedment varies with best fiber embedment at 0.65 and worst at 1.00. Another way of considering this fraction is that approximately 65% of a surface of the slurry is covered by fibers. This is further described in U.S. application Ser. No. 11/555,661 filed Nov. 1, 2006, incorporated herein by reference.

Let,

| | |
|---|---|
| $v_t =$ | Total volume of a fundamental fiber-slurry layer |
| $v_{f,l} =$ | Total fiber volume/layer |
| $v_{f1} =$ | Volume of fiber in discrete fiber layer 1 of a fundamental fiber-slurry layer |
| $v_{f2} =$ | Volume of fiber in discrete fiber layer 2 of a fundamental fiber-slurry layer |
| $v_{s,l} =$ | Volume of slurry in a fundamental fiber-slurry layer |
| $V_{f,l} =$ | Total volume fraction of fibers in a fundamental fiber-slurry layer |
| $d_f =$ | Diameter of individual fiber strand |
| $l_f =$ | Length of individual fiber strand |
| $t_l =$ | Total thickness of individual layer including slurry and fibers |
| $t_{s,l} =$ | Slurry layer thickness in a fundamental fiber-slurry layer |
| $X_f =$ | Ratio of layer 2 fiber volume to layer 1 fiber volume of a fundamental fiber-slurry layer |
| $n_{f,l}, n_{f1,l}, n_{f2,l} =$ | Total number of fibers in a fiber layer |
| $s_{f,l}^P, s_{f1,l}^P, s_{f2,l}^P =$ | Total projected surface area of fibers contained in a fiber layer |
| $S_{f,l}^P, S_{f1,l}^P, S_{f2,l}^P =$ | Projected fiber surface area fraction for a fiber layer |

Projected fiber surface area fraction of fiber layer 1, $S_{f1,l}^P$ is defined as follows:

$$S_{f1,l}^P = \frac{\text{Projected surface area of all fibers in layer 1, } S_{f1,l}^P}{\text{Projected surface area of the slurry layer, } S_{s,l}^P} \quad (1)$$

The projected fiber surface area fraction of fiber layer 1, $S_{f1,l}^P$, can be derived as:

$$S_{f1,l}^P = \frac{4V_{f,l}t_l}{\pi(1+X_f)d_f} \quad (2)$$

Similarly, the projected fiber surface area fraction of fiber layer 2, $S_{f2,l}^P$ can be derived as:

$$S_{f2,l}^P = \frac{4X_f V_{f,l}t_l}{\pi(1+X_f)d_f} \quad (3)$$

Equations 2 and 3 depict dependence of the parameter projected fiber surface area fraction, $S_{f1,l}^P$ and $S_{f2,l}^P$ on several other variables in addition to the variable total fiber volume fraction, $V_{f,l}$. These variables are diameter of fiber strand, thickness of discrete slurry layer, and the amount (proportion) of fibers in the individual discrete fiber layers.

Experimental observations confirm that the embedment efficiency of a layer of fiber network laid over a cementitious slurry layer is a function of the parameter "projected fiber surface area fraction". It has been found that the smaller the projected fiber surface area fraction, the easier it is to embed the fiber layer into the slurry layer. The reason for good fiber embedment efficiency can be explained by the fact that the extent of open area or porosity in a layer of fiber network increases with decreases in the projected fiber surface area fraction. With more open area available, the slurry penetration through the layer of fiber network is augmented, which translates into enhanced fiber embedment efficiency.

Accordingly, to achieve good fiber embedment efficiency, the objective function becomes keeping the fiber surface area fraction below a certain critical value. It is noteworthy that by varying one or more variables appearing in the Equation 1, the projected fiber surface area fraction can be tailored to achieve good fiber embedment efficiency.

Different variables that affect the magnitude of projected fiber surface area fraction are identified and approaches have been suggested to tailor the magnitude of "projected fiber surface area fraction" to achieve good fiber embedment efficiency. These approaches involve varying one or more of the following variables to keep projected fiber surface area fraction below a critical threshold value: number of distinct fiber and slurry layers, thickness of distinct slurry layers and diameter of fiber strand.

Based on this fundamental work, the preferred magnitudes of the projected fiber surface area fraction $S_{f1,l}^P$, have been discovered to be as follows:

| | |
|---|---|
| Preferred projected fiber surface area fraction, $S_{f1,l}^P$ | <0.65 |
| Most preferred projected fiber surface area fraction, $S_{f1,l}^P$ | <0.45 |

For a design panel fiber volume fraction, $V_f$, for example a percentage fiber volume content in each slurry layer of 1-5%, achievement of the aforementioned preferred magnitudes of projected fiber surface area fraction can be made possible by tailoring one or more of the following variables—total number of distinct fiber layers, thickness of distinct slurry layers and fiber strand diameter. In particular, the desirable ranges for these variables that lead to the preferred magnitudes of projected fiber surface area fraction are as follows:

Thickness of Distinct Slurry Layers, $t_{s,l}$

| | |
|---|---|
| Preferred thickness of distinct slurry layers, $t_{s,l}$ | ≦0.35 inches |
| More Preferred thickness of distinct slurry layers, $t_{s,l}$ | ≦0.25 inches |
| Most preferred thickness of distinct slurry layers, $t_{s,l}$ | ≦0.15 inches |

Fiber Strand Diameter, $d_f$

| | |
|---|---|
| Preferred fiber strand diameter, $d_f$ | ≧30 tex |
| Most preferred fiber strand diameter, $d_f$ | ≧70 tex |

Referring now to FIG. 2, a fragment of the SCP panel 92 made from fibers and a slurry. The cement portion of the slurry comprises 65 wt. % Calcium sulfate alpha hemihydrate, 22 wt. % Type III Portland cement, 12 wt. % Silica Fume, and 1 wt. % hydrated lime. The liquid portion of the slurry comprises 99.19 wt. % water and 0.81 wt. % ADVACAST superplasticizer by W.R. Grace and Co. The liquid cement weight ratio was 0.55 and the Aggregate (EXTENDOSPHERES SG microspheres):Cement weight ratio was 0.445.

The slurry was produced according to the present process, using the present system, and is shown to have four slurry layers, 77, 80, 88 and 90. This panel should be considered exemplary only in that a panel 92 produced under the present system may have one or more layers. By using the above mathematical relationships, the slurry layers 77, 80, 88 and 90 can have different fiber volume fractions. For example, skin or face layers 77, 90 have a designated fiber volume fraction $V_f$ of 5%, while inner layers 80, 88 have a designated $V_f$ of 2%. This provides a panel with enhanced outer strength, and an inner core with comparatively less strength, which may be desirable in certain applications, or to conserve fibers for cost reasons. It is contemplated that the fiber volume fraction $V_f$ may vary among the layers 77, 80, 88, 90 to suit the application, as can the number of layers.

Also, modifications of the fiber content can be accomplished within each slurry layer. For example, with a fiber volume fraction $V_f$ of 5%, for example, fiber layer 1 optionally has a designated slurry volume fraction of 3% and fiber layer 2 optionally has a designated fiber volume fraction of 2%. Thus, $X_f$ will be ⅔.

The results of panel manufactured using the system of FIG. 6, is described in the description and Table 1 of U.S. patent application Ser. No. 11/555,655 (issued as U.S. Pat. No. 7,524,386), entitled METHOD FOR WET MIXING CEMENTITIOUS SLURRY FOR FIBER-REINFORCED STRUCTURAL CEMENT PANELS, filed Nov. 1, 2006, the disclosure of which is incorporated herein in its entirety.

In the present system 130, by increasing the number of fiber layers, each with its own fiber surface area fraction, more fibers can be added to each slurry layer without requiring as many layers of slurry. Using the above process, the panel 92 can have the same thickness as prior panels, with the same number of fibers of the same diameter, with fewer number of slurry layers. Thus, the resulting panel 92 has layers of enhanced strength but is less expensive to produce, due to a shorter production line using less energy and capital equipment.

SCP Panel Formulations

While a variety of settable slurries are contemplated, the present invention is particularly designed for use in producing structural cement panels. As such, the slurry is preferably made up of varying amounts of Portland cement, gypsum, aggregate, water, accelerators, plasticizers, foaming agents, fillers and/or other ingredients well known in the art. The relative amounts of these ingredients, including the elimination of some of the above or the addition of others, may vary to suit the application. A supply of chopped fibers 18, which in the preferred embodiment are chopped fiberglass fibers, are dropped or sprinkled upon the moving slurry web 16.

The components preferably used to make the structural cementitious panels (SCP) according to the process of the invention are hydraulic cement, calcium sulfate alpha hemihydrate, an active pozzolan such as silica fume, lime, ceramic microspheres, alkali-resistant glass fibers, superplasticizer (e.g., sodium salt of polynapthalene sulfonate), and water. Typically, both hydraulic cement and calcium sulfate alpha hemihydrate are present. Long term durability of the composite is compromised if calcium sulfate alpha hemihydrate is not present along with silica fume. Water/moisture durability is compromised when Portland cement is not present. Small amounts of accelerators and/or retarders may be added to the composition to control the setting characteristics of the green (i.e., uncured) material. Typical non-limiting additives include accelerators for hydraulic cement such as calcium chloride, accelerators for calcium sulfate alpha hemihydrate such as gypsum, retarders such as DTPA (diethylene triamine pentacetic acid), tartaric acid or an alkali salt of tartaric acid (e.g., potassium tartrate), shrinkage reducing agents such as glycols, and entrained air.

Panels of the invention will include a continuous phase in which alkali-resistant glass fibers and light weight filer, e.g., microspheres, are uniformly distributed. The continuous phase results from the curing of an aqueous mixture of the reactive powders, i.e., blend of hydraulic cement, calcium sulfate alpha hemihydrate, pozzolan, and lime), preferably including superplasticizer and/or other additives.

Typical weight proportions of embodiments of the reactive powders (inorganic binder), e.g., hydraulic cement, calcium sulfate alpha hemihydrate, pozzolan and lime, in the invention, based on dry weight of the reactive powders, are shown in TABLE A. TABLE B lists typical ranges of reactive powders, lightweight filler, and glass fibers in compositions of the present invention.

TABLE A

| Weight Proportion (%) Reactive Powder | | |
|---|---|---|
| | Broad | Typical |
| Hydraulic Cement | 20-55 | 25-40 |
| Calcium Sulfate Alpha Hemihydrate | 35-75 | 45-65 |
| Pozzolan | 5-25 | 10-15 |
| Lime | up to 3.5 or 0.75-1.25 | 0.2 to 3.5. |

TABLE B

| SCP Composition | | |
|---|---|---|
| | Typical Weight Proportion (%) Broad | Typical Weight (dry basis) Proportion (%) Typical |
| Reactive Powder | 35-70 | 35-68 |
| Lightweight Filler | 20-50 | 23-49 |
| Glass Fibers | 5-20 | 5-17 |

Lime is not required in all formulations of the invention, but it has been found that adding lime provides superior panels and it usually will be added in amounts greater than about 0.2 wt. %. Thus, in most cases, the amount of lime in the reactive powders will be about 0.2 to 3.5 wt. %.

In a first embodiment of the SCP panel, the dry ingredients of the composition will be the reactive powders (i.e., blend of hydraulic cement, calcium sulfate alpha hemihydrate, pozzolan, and lime), ceramic microspheres and alkali-resistant glass fibers, and the wet ingredients of the composition will be water and superplasticizer. The dry ingredients and the wet ingredients are combined to produce the panel of the invention. The ceramic microspheres are uniformly distributed in the matrix throughout the full thickness of the panel. Of the total weight of dry ingredients, the panel of the invention is formed from about 49 to 56 wt. % reactive powders, 35 to 42 wt. % ceramic microspheres and 7 to 12 wt. % alkali-resistant glass fibers. In a broad range, the panel of the invention is formed from 35 to 58 wt. % reactive powders, 34 to 49 wt. % lightweight filler, e.g., ceramic microspheres, and 6 to 17 wt.

% alkali-resistant glass fibers of the total dry ingredients. The amounts of water and superplasticizer added to the dry ingredients will be sufficient to provide the desired slurry fluidity needed to satisfy processing considerations for any particular manufacturing process. The typical addition rates for water range between 35 to 60% of the weight of reactive powders and those for superplasticizer range between 1 to 8% of the weight of reactive powders.

The glass fibers are monofilaments having a diameter of about 5 to 25 microns (micrometers), preferably about 10 to 15 microns (micrometers). The monofilaments typically are combined in 100 filament strands, which may be bundled into rovings of about 50 strands. The length of the glass fibers will typically be about 0.25 to 1 or 2 inches (6.3 to 25 or 50 mm) or about 1 to 2 inches (25 to 50 mm) and broadly about 0.25 to 3 inches (6.3 to 76 mm). The fibers have random orientation, providing isotropic mechanical behavior in the plane of the panel.

The second embodiment of the SCP panel contains a blend of ceramic and glass microspheres uniformly distributed throughout the full thickness of the panel. Accordingly, in the second embodiment of the SCP panel, the dry ingredients of the composition will be the reactive powders (hydraulic cement, calcium sulfate alpha hemihydrate, pozzolan, and lime), ceramic microspheres, glass microspheres, and alkali-resistant glass fibers, and the wet ingredients of the composition will be water and superplasticizer. The dry ingredients and the wet ingredients will be combined to produce the panel of the invention. The volume fraction of the glass microspheres in the panel will typically be in the range of 7 to 15% of the total volume of dry ingredients. Of the total weight of dry ingredients, the panel of the invention is formed from about 54 to 65 wt. % reactive powders, 25 to 35 wt. % ceramic microspheres, 0.5 to 0.8 wt. % glass microspheres, and 6 to 10 wt. % alkali-resistant glass fibers. In the broad range, the panel of the invention is formed from 42 to 68 wt. % reactive powders, 23 to 43 wt. % lightweight fillers, e.g., ceramic microspheres, 0.2 to 1.0 wt. % glass microspheres, and 5 to 15 wt. % alkali-resistant glass fibers, based on the total dry ingredients. The amounts of water and superplasticizer added to the dry ingredients will be adjusted to provide the desired slurry fluidity needed to satisfy the processing considerations for any particular manufacturing process. The typical addition rates for water range between 35 to 70% of the weight of reactive powders, but could be greater than 60% up to 70% (weight ratio of water to reactive powder of 0.6/1 to 0.7/1), preferably 65% to 75%, when it is desired to use the ratio of water-to-reactive powder to reduce panel density and improve cutability. The amount of superplasticizer will range between 1 to 8% of the weight of reactive powders. The glass fibers are monofilaments having a diameter of about 5 to 25 microns (micrometers), preferably about 10 to 15 microns (micrometers). They typically are bundled into strands and rovings as discussed above. The length of the glass fibers typically is about 1 to 2 inches (25 to 50 mm) and broadly about 0.25 to 3 inches (6.3 to 76 mm). The fibers will have random orientation providing isotropic mechanical behavior in the plane of the panel.

In the third embodiment of the SCP panel, a multi-layer structure in the panel is created where the outer layer(s) have improved nailability (fastening ability)/cutability. This is achieved by increasing the water-to-cement ratio in the outer layer(s), and/or changing the amount of filler, and/or adding an amount of polymer microspheres sufficiently small such that the panel remains noncombustible. The core of the panel will typically contain ceramic microspheres uniformly distributed throughout the layer thickness or alternatively, a blend of one or more of ceramic microspheres, glass microspheres and fly ash cenospheres.

The dry ingredients of the core layer of this embodiment of the SCP panel employed in the present invention will be the reactive powders (typically hydraulic cement, calcium sulfate alpha hemihydrate, pozzolan, and lime), lightweight filler particles (typically microspheres such as ceramic microspheres alone or one or more of ceramic microspheres, glass microspheres and fly ash cenospheres), and alkali-resistant glass fibers, and the wet ingredients of the core layer are water and superplasticizer. The dry ingredients and the wet ingredients will be combined to produce the core layer of the panel of the invention. Of the total weight of dry ingredients, the core of the panel of the invention preferably is formed from about 49 to 56 wt. % reactive powders, 35 to 42 wt. % hollow ceramic microspheres and 7 to 12 wt. % alkali-resistant glass fibers, or alternatively, about 54 to 65 wt. % reactive powders, 25 to 35 wt. % ceramic microspheres, 0.5 to 0.8 wt. % glass microspheres or fly ash cenospheres, and 6 to 10 wt. % alkali-resistant glass fibers. In the broad range, the core layer of the panel of this embodiment of the SCP panel is typically formed by about 35 to 58 wt. % reactive powders, 34 to 49 wt. % lightweight fillers, e.g., ceramic microspheres, and 6 to 17 wt. % alkali-resistant glass fibers, based on the total dry ingredients, or alternatively, about 42 to 68 wt. % of reactive powders, 23 to 43 wt. % ceramic microspheres, up to 1.0 wt. %, preferably 0.2 to 1.0 wt. %, other lightweight filler, e.g., glass microspheres or fly ash cenospheres, and 5 to 15 wt. % alkali-resistant glass fibers. The amounts of water and superplasticizer added to the dry ingredients will be adjusted to provide the desired slurry fluidity needed to satisfy the processing considerations for any particular manufacturing process. The typical addition rates for water will range between 35 to 70% of the weight of reactive powders but will be greater than 60% up to 70% when it is desired to use the ratio of water-to-reactive powders to reduce panel density and improve nailability and those for superplasticizer will range between 1 to 8% of the weight of reactive powders. When the ratio of water-to-reactive powder is adjusted, the slurry composition will be adjusted to provide the panel of the invention with the desired properties.

There is generally an absence of polymer microspheres and an absence of polymer fibers that would cause the SCP panel to become combustible.

The dry ingredients of the outer layer(s) of this embodiment of the SCP panel will be the reactive powders (typically hydraulic cement, calcium sulfate alpha hemihydrate, pozzolan, and lime), lightweight filler particles (typically microspheres such as ceramic microspheres alone or one or more of ceramic microspheres, glass microspheres and fly ash cenospheres), and alkali-resistant glass fibers, and the wet ingredients of the outer layer(s) will be water and superplasticizer. The dry ingredients and the wet ingredients are combined to produce the outer layers of the panel of the invention. In the outer layer(s) of the panel of this embodiment of the SCP panel, the amount of water is selected to furnish good fastening and cutting ability to the panel. Of the total weight of dry ingredients, the outer layer(s) of the panel of the invention preferably are formed from about 54 to 65 wt. % reactive powders, 25 to 35 wt. % ceramic microspheres, 0 to 0.8 wt. % glass microspheres, and 6 to 10 wt. % alkali-resistant glass fibers. In the broad range, the outer layers of the panel of the invention are formed from about 42 to 68 wt. % reactive powders, 23 to 43 wt. % ceramic microspheres, up to 1.0 wt. % glass microspheres (and/or fly ash cenospheres), and 5 to 15 wt. % alkali-resistant glass fibers, based on the total dry ingredients. The amounts of water and superplasticizer added to the dry ingredients are adjusted to provide the desired slurry fluidity needed to satisfy the processing considerations for any particular manufacturing process. The typical addition rates for water range between 35 to 70% of the weight of reactive powders and particularly greater than 60% up to 70% when the ratio of water-to-reactive powders is adjusted to reduce panel density and improve nailability, and typical addition rates for superplasticizer will range between 1 to 8% of the weight of reactive powders. The preferable thickness of the outer layer(s) ranges between 1/32 to 4/32 inches (0.8 to 3.2 mm) and the thickness of the outer layer when only one is used will be less than 3/8 of the total thickness of the panel.

In both the core and outer layer(s) of this embodiment of the SCP panel, the glass fibers are monofilaments having a diameter of about 5 to 25 microns (micrometers), preferably 10 to 15 microns (micrometers). The monofilaments typically are bundled into strands and rovings as discussed above. The length typically is about 1 to 2 inches (25 to 50 mm) and broadly about 0.25 to 3 inches (6.3 to 76 mm). The fiber orientation will be random, providing isotropic mechanical behavior in the plane of the panel.

The invention also includes a fourth embodiment of a multi-layer panel having a density of 65 to 90 pounds per cubic foot and capable of resisting shear loads when fastened to framing and comprising a core layer of a continuous phase resulting from the curing of an aqueous mixture, a continuous phase resulting from the curing of an aqueous mixture comprising, on a dry basis, 35 to 70 weight % reactive powder, 20 to 50 weight percent lightweight filler, and 5 to 20 weight % glass fibers, the continuous phase being reinforced with glass fibers and containing the lightweight filler particles, the lightweight filler particles having a particle specific gravity of from 0.02 to 1.00 and an average particle size of about 10 to 500 microns (micrometers); and at least one outer layer of respectively another continuous phase resulting from the curing of an aqueous mixture comprising, on a dry basis, 35 to 70 weight % reactive powder, 20 to 50 weight percent lightweight filler, and 5 to 20 weight % glass fibers, the continuous phase being reinforced with glass fibers and containing the lightweight filler particles, the lightweight filler particles having a particle specific gravity of from 0.02 to 1.00 and an average particle size of about 10 to 500 microns (micrometers) on each opposed side of the inner layer, wherein the at least one outer layer has a higher percentage of glass fibers than the inner layer.

EXAMPLES

Figure 7:
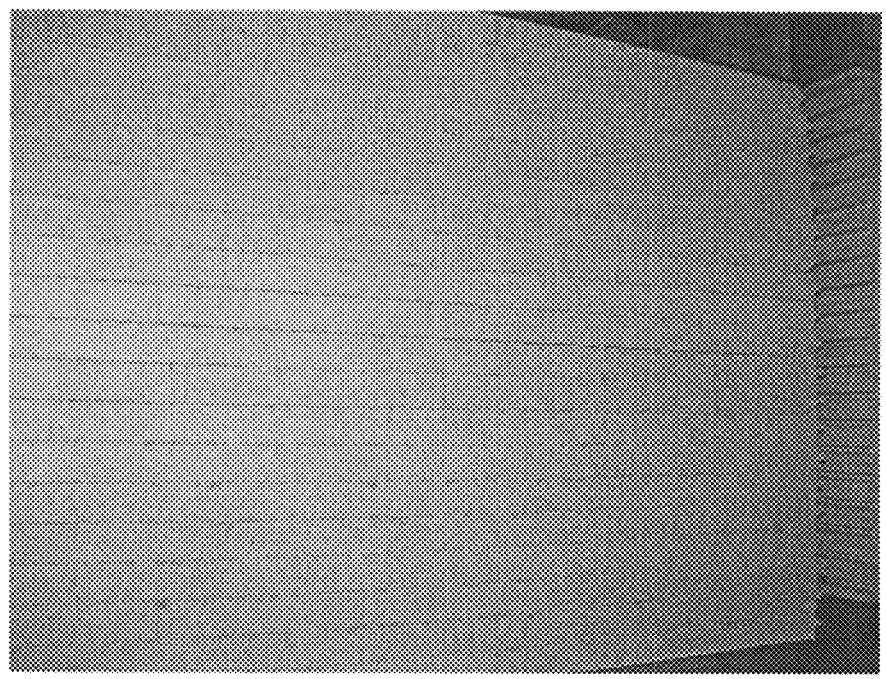
FIG. 7 is a photograph of the structural panel produced on a production line using the smoothing device of this invention after only the second slurry depositing station on the panel production line.

An experimental evaluation of the effectiveness of the present slurry smoothing device was conducted. This objective was achieved by manufacturing panels on a commercial production line similar to that shown in FIG. 6 by building up multiple distinct fiber and slurry layers to produce panels of design thickness. The performance of the proposed slurry smoothing device after the second slurry headbox station and before the next fiber chopper station and second embedment device stations, as shown in FIG. 6, was compared with the conventional production line in which only one floating screed plate or shroud is used after the final embedment station in a multiple slurry and chopped fiber layer, as disclosed in co-pending U.S. patent application Ser. No. 11/555,661 (United States Patent Application Publication No. 2008/0099133) filed Nov. 1, 2006. The results of large size defects (FIGS. 8 and 9) as well as smaller size but still significant defects from smaller air holes (FIG. 10), compared to the essentially defect free panel of the invention in FIG. 7, demonstrated the benefit of the process and smoothing device of this invention. Although the panels made using only one slurry smoothing device after the second slurry depositing station in a three or four multi-stage process is commercially acceptable in meeting the quality control standards for the SCP panels, as shown in FIG. 7. The presence of even pin hole size defects from air bubbles in FIG. 7 may be removed by optional use of one or more additional smoothing devices 160 after the third and/or fourth slurry depositing stations in a multi-stage panel production line. Further details of the experimental evaluation are as follows:

Example Formulation

Standard SCP formulation shown in Tables A and B, above, were used to manufacture all panels. The reactive powder used was a blend of ASTM Type III Portland cement, alpha hemihydrate, silica fume and lime. Hollow ceramic spheres were used as lightweight fillers to reduce the material/panel density. Polynapthalene sulfonate type superplasticizer was used as the water-reducing admixture. Alkali-resistant glass fibers chopped from a continuous roving with designation NEG ARG-103 (procured from Nippon Electric Glass Company, North America) were used as the reinforcing fibers. For this continuous roving, the roving tex was 2500 and the strand tex was 80. Each fiber strand was an assemblage of 200 alkali-resistant glass fiber monofilaments. The length of the fibers used was 40 mm.

The SCP slurry used in the practice of this invention has a density of about 78 to 82 pounds per cubic foot compared to a gypsum board slurry used in typical fiberglass reinforced gypsum board of about 60 to 65 pounds per cubic foot.

The fiberglass content of typical fiberglass reinforced gypsum board slurry is vastly different than SCP slurry. Standard 5/8 in. fiberglass reinforced gypsum slurry contains about 5 to 6 pounds fiber/MSF. In contrast, an SCP panel has a fiberglass content of about 180 to 250, or 200 to 240, e.g., 230, pounds fiber/MSF. Unlike the fiberglass reinforced gypsum slurry in which fiberglass is uniformly mixed into the slurry, the fiberglass in the SCP slurry is a chopped fiberglass fiber which is deposited on the carrier, then the SCP slurry is spread and smoothed over the chopped fibers in accordance with the smoothing device of this invention without disturbing or orienting the fibers below the cementitious slurry layer.

The following formulation is typical of the formulations used for manufacturing the fiber reinforced cementitious panels in the current panel production line:

The cement portion of the slurry comprises about 65 wt. % calcium sulfate alpha hemihydrate, about 22 wt. % Type III Portland cement, about 12 wt. % silica fume, and about 1 wt. % hydrated lime. The liquid portion of the slurry comprises about 99.2 wt. % water and about 0.8 wt. % ADVACAST superplasticizer by W.R. Grace and Co. The liquid:cement weight ratio was about 0.55:1 and the Aggregate (EXTENDOSPHERES SG hollow ceramic microspheres):cement weight ratio was about 0.445:1.

Example Results

A fiber embedment device must effectively embed a distinct layer of fiber network into a distinct layer of slurry for producing fiber reinforced cementitious panels.

To have desirable product, USG's FORTACRETE Product Bulletin 14-07-001 at page 4 provides the current "VISUAL APPEARANCE SPECIFICATIONS and testing frequency for SCP panel production online observations for slurry spread:

Slurry Spread Definition: Uniform and continuous slurry headbox output visually apparent in the field of the board. No visually noticeable unusual slurry distribution or patterns should be present in the field or edges.

Reject Specification Panels containing such characteristics must be put on hold and must be released/rejected based on the results from the quality control testing on the final panel."

Figure 5A:
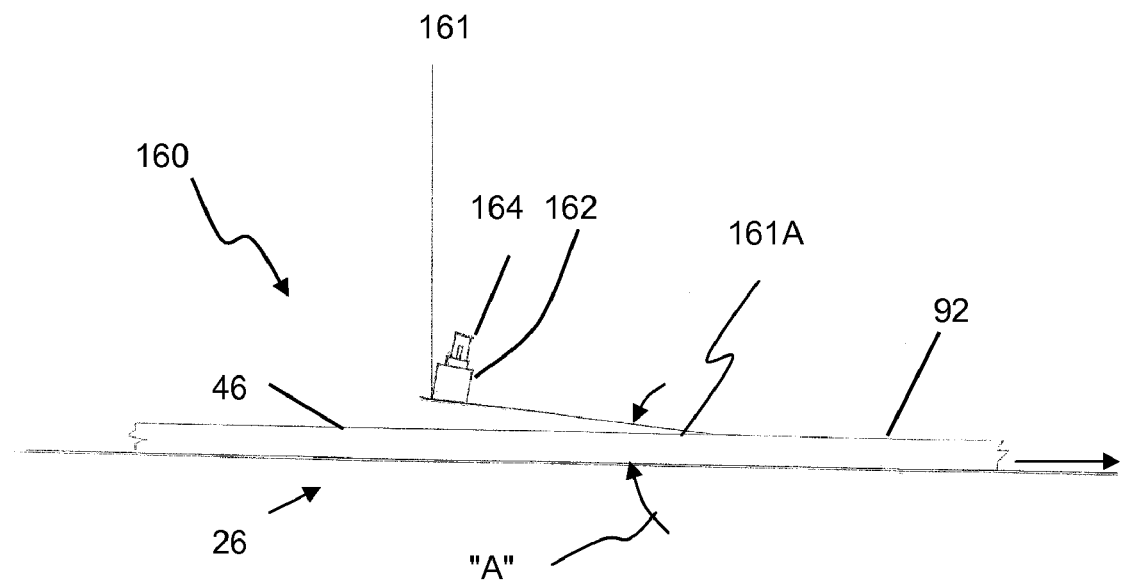
FIG. 5A is a side view along view VA-VA the smoothing device of FIG. 5 with the slurry "ponding" behind the smoothing plate as it travels under the smoothing plate and is smoothed on the top surface of the formed panel as it travels on the conveyor belt.

The above description of the visual testing refers to unusual slurry distribution including the times when the slurry curtain coming off the doctor blade "breaks" for any reason and a long strip is left where no slurry has been deposited onto the belt or on the forming panel product, as seen by the presence of bare fiberglass fibers. Prior to the development of the smoothing device of the present invention, this panel would have to be followed through the entire panel production process for additional testing and possible panel rejection. In the practice of the present invention, if an incident of a "break" in the slurry occurs while the smoothing bar is in use, the slight head of excess slurry that builds up behind the smoothing bar or plate, as shown in FIG. 5A at 46, the excess slurry easily fills this area with slurry correcting the problem and the forming panel does not have to undergo further testing and/or rejection at the end of the production line.

In this example, the fiberglass fibers were deposited upon an upper surface of the cementitious slurry on the carrier web or belt. Simply by deposition a certain percentage of the fibers became mixed into the slurry because the carrier web or belt was also moving in a direction of travel from the first downward motion of the grid. In this manner, a churning dynamic movement was also created which enhanced the embedment of the fibers.

Except for the smoothing process of this invention, the identical manufacturing process was used for both (a) the panels made with the use of one smoothing device of the current invention after the second slurry depositing station and (b) SCP panel made by the process of co-pending applications.

FIG. 7 is a photograph of the structural panel produced on a production line using the smoothing device of this invention after only the second slurry depositing station on the panel production line.

Figure 8:
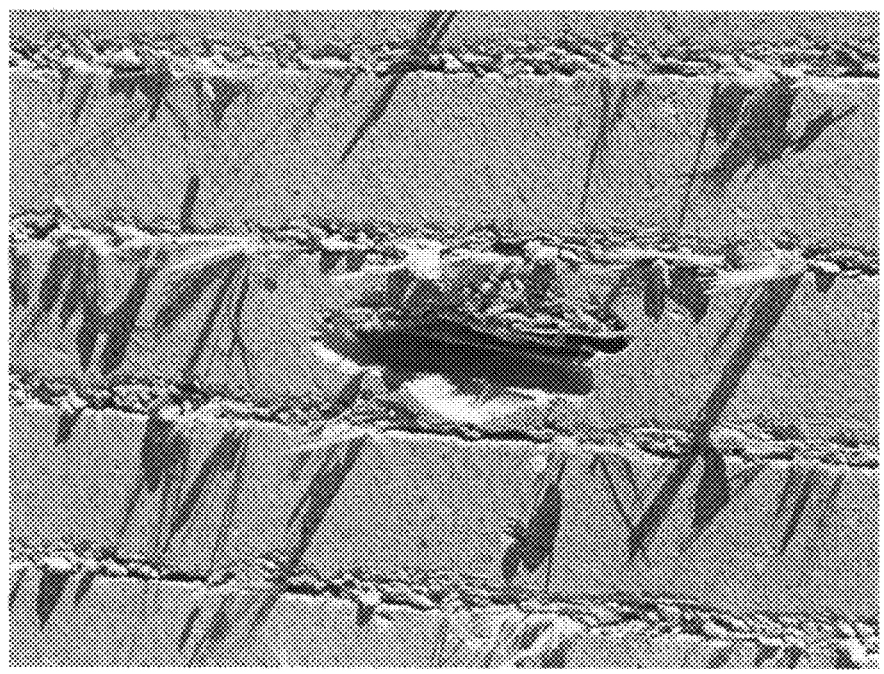
FIG. 8 is a photograph of a structural panel produced on the production line without using the smoothing device of this invention and having a major core failure due to air voids in the core.

FIG. 8 is a photograph of a structural panel produced on the production line without using the smoothing device of this invention and having a major core failure due to air voids in the core.

Figure 9:
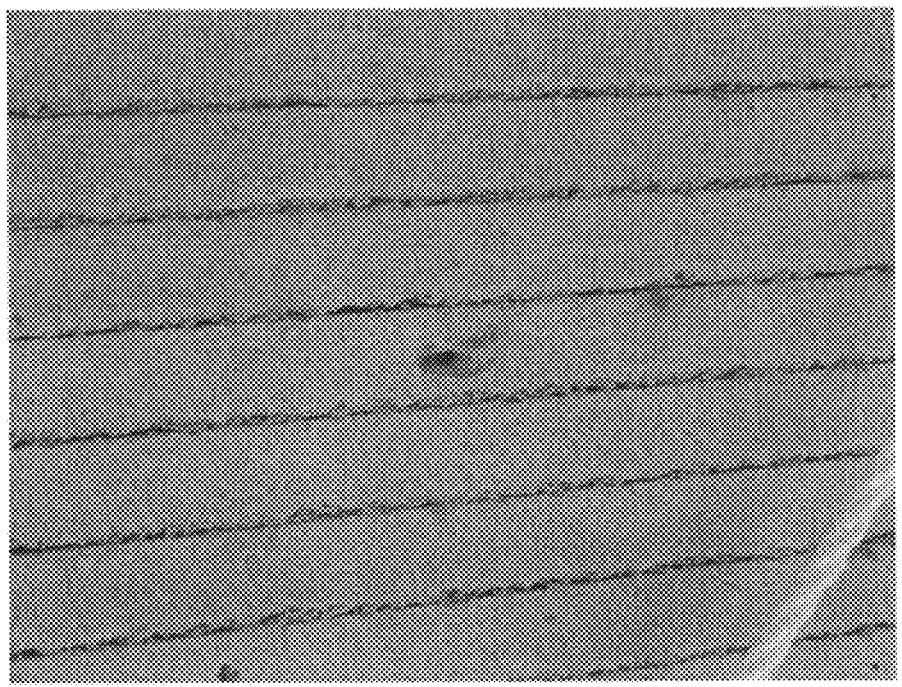
FIG. 9 is another photograph of a structural panel produced on the production line without using the smoothing device of this invention and having a major core failure due to air voids in the core.

FIG. 9 is another photograph of a structural panel produced on the production line without using the smoothing device of this invention and having a major core failure due to air voids in the core.

Figure 10:
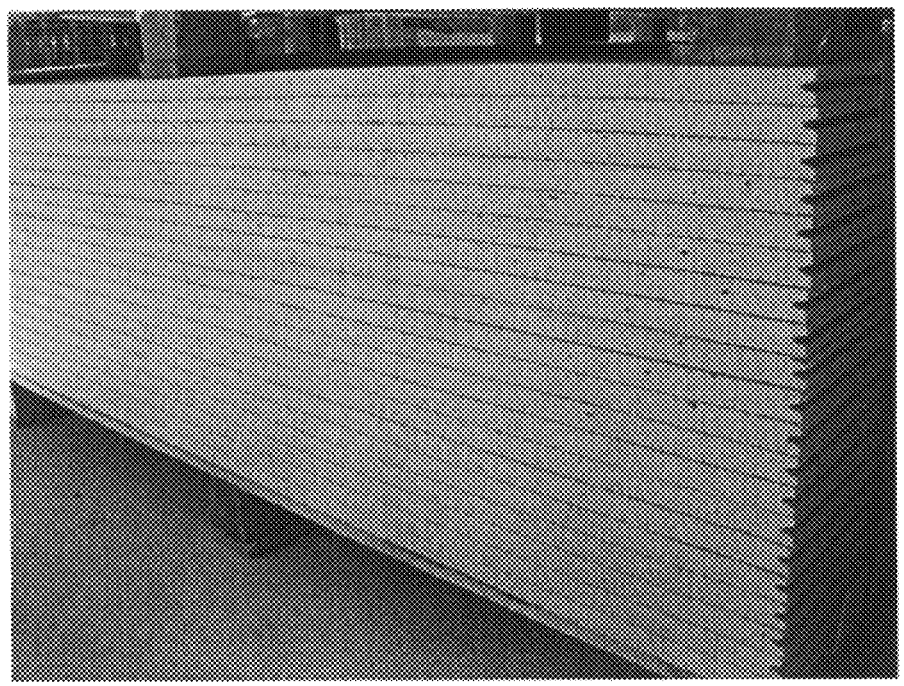
FIG. 10 is another photograph of the structural panels produced on the panel production line without using the smoothing device of this invention showing the defects cause by even small air voids in the panel core.

FIG. 10 is another photograph of the structural panels produced on the panel production line without using the smoothing device of this invention showing the defects cause by even small air voids in the panel core.

The photographs in FIG. 7 versus FIGS. 8-10 shows the influence of the smoothing method and device on panel cores manufactured using distinct slurry and fiber layers.

The experimental results obtained in the production of fiber reinforced SCP panels on a production line demonstrate that the efficiency of the present smoothing method and device is equivalent to the current industry standard method of panel production, but with less need for continuing inspections and testing of panels and risk of panels being rejected for defective cores or delamination. The slurry smoothing device of this invention is particularly useful in the manufacturing processes where it is desired to produce panels by building up several distinct layers of slurry and fibers.

While particular embodiments of a slurry smoothing device for a fiber-enhanced slurry have been shown and described, it will be appreciated by those skilled in the art that changes and modifications may be made thereto without departing from the invention in its broader aspects and as set forth in the following claims.

What is claimed is:

1. A continuous method for making structural cementitious panel without defects in its core caused by air voids around embedded chopped fibers by smoothing the top surface of a formed, but not yet set, chopped fiber reinforced cementitious slurry comprising the steps of:

applying a first layer of cementitious slurry over a moving carrier, smoothing the first layer of cementitious slurry to evenly distribute the slurry over the entire surface of the slurry and uniformly cover any exposed chopped fibers within the slurry, to eliminate air voids in the slurry around the fibers, and pock marks and grooves in the cementitious slurry, without scratching or tearing the surface of the slurry, the smoothing being performed with a pivotally mounted smoothing device comprising a plate with a stiffening member and a vibrator, wherein the to surface of the first layer of cementitious slurry contacts the downstream portion of the bottom surface of the plate of the smoothing device, while the plate is vibrating, transversely to the direction of travel of the panel, while spacing the upstream portion of the plate from the to surface of the slurry, to smooth the to surface of the first layer of cementitious slurry, applying a first overlayer of fiber directly over the smoothed first layer of cementitious slurry; and embedding the first overlayer of fiber into the smoothed first layer of cementitious slurry to form a first layer of cementitious material having fiber reinforcement comprising uniformly distributed alkali-resistant glass fibers, wherein the cementitious slurry comprises an aqueous mixture of, on a dry basis,
35 to 70 weight % reactive powder,
5 to 20 weight % said alkali-resistant glass fibers,
20 to 50 weight % lightweight filler particles, and
wherein the reactive powder comprises, on a dry basis,
35 to 75 wt. % calcium sulfate alpha hemihydrate,
20 to 55 wt. % hydraulic cement,
0.2 to 3.5 wt. % lime, and
5 to 25 wt. % of an active pozzolan, wherein the cementitious material is uniformly reinforced with the alkali-resistant glass fibers and the lightweight filler particles are uniformly distributed in the cementitious material, wherein said lightweight filler particles are selected from at least one member of the group consisting of ceramic microspheres, glass microspheres, fly ash cenospheres and perlite, and wherein the cementitious slurry optionally comprises sand.

2. The method of claim 1, comprising:

transporting the cementitious slurry on the moving carrier having a direction of travel relative to a support frame;

contacting a top surface of the first layer of cementitious slurry with a downstream portion of a bottom surface of a plate of the pivotally mounted smoothing device, transversely to the direction of travel of the panel, while spacing an upstream portion of the plate from the top surface of the slurry, to smooth the top surface of the slurry;

depositing the first overlayer of chopped fiber reinforcement on the top surface of the smoothed slurry; and transporting the smoothed slurry and chopped fiber overlayer to a fiber embedment device to perform the embedding to form the first layer of cementitious material having fiber reinforcement.

3. The method of claim 2, further comprising:
depositing an underlayer of chopped fiber over the top surface of the moving carrier; and
depositing the first layer of cementitious slurry over a top surface of the underlayer of the chopped fiber.

4. The method of claim 2, further comprising depositing an additional layer of the cementitious slurry over a top surface of the first layer of cementitious material having fiber reinforcement.

5. The method of claim 2, further comprising:
depositing an additional layer of the cementitious slurry over a top surface of the first layer of cementitious material having fiber reinforcement;
smoothing the additional layer of cementitious slurry;
depositing an additional overlayer of fiber over the top surface of the smoothed additional layer of cementitious slurry; and
embedding the additional layer of fiber into the smoothed additional layer of cementitious slurry to form an additional layer of cementitious material having fiber reinforcement.

6. The method of claim 2, wherein the smoothing device floats over the surface of the settable first layer of cementitious slurry to smooth the surface and eliminate pock marks and grooves and evenly distribute the slurry over the entire surface of the first layer of cementitious slurry and uniformly cover any exposed fibers with the slurry without scratching or tearing the surface of the first layer of cementitious slurry before another layer of chopped fibers is deposited over the first layer of cementitious slurry.

7. The method of claim 2, wherein the plate of the smoothing device is disposed over the entire width of the formed first layer of cementitious slurry.

8. The method of claim 2, wherein the formed first layer of cementitious slurry contacts the plate for about 0.1 to about 4.0 seconds.

9. The method of claim 2, further comprising
depositing a first underlayer of fiber over the second layer of cementitious slurry containing fiber reinforcement on the moving carrier;
applying the first layer of cementitious slurry directly over the first underlayer layer of fiber;
depositing a second layer of cementitious slurry over the moving carrier;
depositing a second overlayer of fiber on said second layer of cementitious slurry;
embedding said second overlayer of fiber in said second layer of cementitious slurry to form a second layer of cementitious material having fiber reinforcement; and
wherein the first layer of cementitious slurry is deposited over the second layer of cementitious material having fiber reinforcement.

10. The method of claim 2, wherein the pressure exerted by the smoothing device apparatus over the area of the first layer of cementitious slurry surface is about 0.05 to about 0.5 pounds per square inch, wherein the pressure applied to the top surface of the slurry is sufficient to smooth the top surface of the slurry without scraping off excess slurry and without tearing the fiber and slurry layer.

11. The method of claim 10, wherein the pressure exerted by the smoothing device over the area of the first layer of cementitious slurry surface is about 0.05 to 0.15 pounds per square inch.

12. The method of claim 1, further comprising
applying an underlayer of fiber reinforcement over the moving carrier, wherein the first layer of cementitious slurry is deposited directly onto the underlayer before smoothing the first layer of cementitious slurry.

13. The method of claim 1, wherein the lightweight filler particles have a particle specific gravity of from 0.02 to 1.00 and an average particle size of about 10 to 500 microns (micrometers).

14. The method of claim 1, wherein the cementitious material comprises ceramic microspheres which have a mean particle size from 50 to 250 microns and/or fall within a particle size range of 10 to 500 microns.

15. The method of claim 1, wherein the layer of cementitious material comprises an aqueous mixture comprising, on a dry basis,
35 to 58 wt. % of the reactive powder,
6 to 17 wt. % of the glass fibers, and
34 to 49 wt. % of said lightweight filler particles selected from at least one member of the group consisting of ceramic microspheres, glass microspheres, fly ash cenospheres and perlite.

16. The method of claim 1, wherein said embedding comprises:
passing the first layer of cementitious slurry with the deposited chopped fibers through a fiber embedment device for use in a structural panel production line to contact a first plurality of axially spaced disks axially fixed to a first integrally formed elongate shaft rotatably secured to the support frame and contact a second plurality of axially spaced disks axially fixed to a second integrally formed elongate shaft rotatably secured to the support frame;
the first shaft being disposed relative to said second shaft to be horizontally aligned so the disks intermesh with each other, and
wherein, when viewed from the side, peripheries of said first and second pluralities of disks overlap each other.

17. The method of claim 1, further comprising:
depositing a second layer of cementitious slurry over the moving carrier;
depositing a second overlayer of fiber on said second layer of cementitious slurry;
embedding said second overlayer of fiber in said second layer of cementitious slurry to form a second layer of cementitious material having fiber reinforcement; and
wherein the first layer of cementitious slurry is deposited over the second layer of cementitious material having fiber reinforcement.

18. The method of claim 17, further comprising
depositing a first underlayer of fiber over the second layer of cementitious slurry containing fiber reinforcement on the moving carrier;
applying the first layer of cementitious slurry directly over the first underlayer layer of fiber;
depositing a second underlayer of fiber over the moving carrier, wherein the second layer of cementitious slurry is applied directly over the second underlayer of fiber.

19. The method of claim 1, wherein the first layer of cementitious slurry comprises water and dry reactive powder such that the first layer of cementitious slurry is 35-70% by weight the reactive powder and wherein the first layer of cementitious slurry is directly applied to the moving carrier.

* * * * *